(12) United States Patent
Lu et al.

(10) Patent No.: US 12,455,682 B2
(45) Date of Patent: Oct. 28, 2025

(54) CROSS-DEVICE OBJECT DRAG METHOD AND DEVICE

(71) Applicant: Huawei Technologies Co., Ltd., Shenzhen (CN)

(72) Inventors: Yuedong Lu, Nanjing (CN); Haijun Wang, Nanjing (CN); Xueer Zhou, Nanjing (CN); Xingchen Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/007,120

(22) PCT Filed: Jul. 27, 2021

(86) PCT No.: PCT/CN2021/108579
§ 371 (c)(1),
(2) Date: Jan. 27, 2023

(87) PCT Pub. No.: WO2022/022490
PCT Pub. Date: Feb. 3, 2022

(65) Prior Publication Data
US 2023/0229300 A1    Jul. 20, 2023

(30) Foreign Application Priority Data
Jul. 29, 2020   (CN) .......................... 202010747173.5

(51) Int. Cl.
*G06F 3/048* (2013.01)
*G06F 3/0485* (2022.01)
(Continued)

(52) U.S. Cl.
CPC .......... *G06F 3/0486* (2013.01); *G06F 3/0485* (2013.01); *G06F 3/04886* (2013.01); *G06F 3/1454* (2013.01)

(58) Field of Classification Search
None
See application file for complete search history.

(56) References Cited

U.S. PATENT DOCUMENTS

| 6,211,879 B1 | 4/2001 | Soohoo |
| 6,331,840 B1 | 12/2001 | Nielson et al. |

(Continued)

FOREIGN PATENT DOCUMENTS

| CN | 101354639 A | 1/2009 |
| CN | 101794448 A | 8/2010 |

(Continued)

OTHER PUBLICATIONS

Han Yumin, Classification of Interaction Modes and Its Significance, CD Technology, Editorial Department Mailbox, Issue 02, 1997, with the English Abstract, 5 pages.

(Continued)

*Primary Examiner* — Hua Lu
(74) *Attorney, Agent, or Firm* — Conley Rose, P.C.

(57) ABSTRACT

A second terminal displays, on a display of the second terminal, an object dragged from a first terminal; the second terminal displays a second cursor on the object; the second terminal receives data of a motion operation that is input by a user by using an input device of the first terminal; and the second terminal displays, on the display of the second terminal based on the motion operation, an animation in which the object moves with the second cursor.

18 Claims, 15 Drawing Sheets

US 12,455,682 B2
Page 2

(51) Int. Cl.
*G06F 3/0486* (2013.01)
*G06F 3/04886* (2022.01)
*G06F 3/14* (2006.01)

(56) References Cited

U.S. PATENT DOCUMENTS

| | | | |
|---|---|---|---|
| 7,730,425 B2 | 6/2010 | De Los Reyes et al. | |
| 7,898,542 B1* | 3/2011 | Yu | G06T 13/00 |
| | | | 725/50 |
| 8,516,440 B1* | 8/2013 | Riggins | H04N 21/8545 |
| | | | 717/113 |
| 8,531,519 B1 | 9/2013 | Peng et al. | |
| 8,607,150 B2 | 12/2013 | Tsai | |
| 8,806,364 B2 | 8/2014 | Hwang | |
| 9,696,825 B2 | 7/2017 | Lin et al. | |
| 10,168,868 B2 | 1/2019 | Lee et al. | |
| 10,234,953 B1* | 3/2019 | Li | G06F 3/1423 |
| 10,664,772 B1* | 5/2020 | Poel | G06F 3/04817 |
| 10,779,085 B1* | 9/2020 | Carrigan | G06F 3/167 |
| 11,029,838 B2 | 6/2021 | Lemay et al. | |
| 11,036,310 B2 | 6/2021 | Seo et al. | |
| 11,196,933 B2 | 12/2021 | Misawa et al. | |
| 11,599,322 B1* | 3/2023 | Johnson | G06F 1/1698 |
| 11,893,219 B2 | 2/2024 | Zhou et al. | |
| 2001/0012025 A1 | 8/2001 | Wojaczynski et al. | |
| 2006/0038741 A1 | 2/2006 | Mori et al. | |
| 2006/0136828 A1 | 6/2006 | Asano | |
| 2007/0055941 A1 | 3/2007 | Bhakta et al. | |
| 2007/0288599 A1 | 12/2007 | Saul et al. | |
| 2009/0027302 A1 | 1/2009 | Li | |
| 2009/0249393 A1* | 10/2009 | Shelton | H04N 21/2368 |
| | | | 375/E7.076 |
| 2010/0041442 A1 | 2/2010 | Hong | |
| 2010/0070899 A1* | 3/2010 | Hunt | G06F 16/95 |
| | | | 709/204 |
| 2010/0281363 A1 | 11/2010 | Inaba | |
| 2011/0080356 A1 | 4/2011 | Kang et al. | |
| 2011/0083099 A1 | 4/2011 | Eun | |
| 2011/0209103 A1 | 8/2011 | Hinckley et al. | |
| 2011/0265027 A1 | 10/2011 | Lipstein et al. | |
| 2012/0046071 A1 | 2/2012 | Brandis et al. | |
| 2012/0096396 A1 | 4/2012 | Ording et al. | |
| 2012/0216126 A1 | 8/2012 | Trivedi et al. | |
| 2012/0226742 A1* | 9/2012 | Momchilov | G06F 3/0481 |
| | | | 709/203 |
| 2012/0297341 A1 | 11/2012 | Glazer et al. | |
| 2012/0327109 A1* | 12/2012 | Ren | H04M 1/2745 |
| | | | 345/619 |
| 2013/0009887 A1 | 1/2013 | Huang et al. | |
| 2013/0050277 A1 | 2/2013 | Wang et al. | |
| 2013/0080143 A1* | 3/2013 | Reeves | G06F 9/451 |
| | | | 713/1 |
| 2013/0135309 A1* | 5/2013 | King | G06F 3/04812 |
| | | | 345/426 |
| 2013/0145290 A1 | 6/2013 | Weber et al. | |
| 2013/0162538 A1 | 6/2013 | Ichieda | |
| 2013/0204945 A1 | 8/2013 | Li et al. | |
| 2013/0318451 A1* | 11/2013 | Wu | G06F 3/038 |
| | | | 715/754 |
| 2013/0321340 A1 | 12/2013 | Seo et al. | |
| 2013/0332872 A1 | 12/2013 | Grinberg | |
| 2013/0342482 A1 | 12/2013 | Kim et al. | |
| 2014/0009394 A1 | 1/2014 | Lee et al. | |
| 2014/0019874 A1 | 1/2014 | Li et al. | |
| 2014/0082519 A1* | 3/2014 | Wang | H04M 1/72403 |
| | | | 715/748 |
| 2014/0136986 A1* | 5/2014 | Martin | H04N 21/43076 |
| | | | 715/748 |
| 2014/0222663 A1 | 8/2014 | Park et al. | |
| 2014/0267248 A1* | 9/2014 | Zou | G06T 15/60 |
| | | | 345/420 |
| 2014/0292720 A1 | 10/2014 | Liang | |
| 2014/0344741 A1 | 11/2014 | Newman | |
| 2014/0365957 A1 | 12/2014 | Louch | |
| 2015/0012831 A1 | 1/2015 | Boggess | |
| 2015/0012905 A1* | 1/2015 | Emmons | G06F 8/38 |
| | | | 717/101 |
| 2015/0020013 A1 | 1/2015 | Kim et al. | |
| 2015/0160914 A1 | 6/2015 | Oitaira | |
| 2015/0180912 A1 | 6/2015 | Dufour | |
| 2015/0195607 A1 | 7/2015 | Kim et al. | |
| 2015/0293741 A1 | 10/2015 | Glazer | |
| 2015/0312458 A1 | 10/2015 | Chen et al. | |
| 2015/0356949 A1* | 12/2015 | Kim | H04W 4/18 |
| | | | 345/173 |
| 2016/0050476 A1* | 2/2016 | Patil | H04R 27/00 |
| | | | 715/728 |
| 2016/0092154 A1 | 3/2016 | Bourlier et al. | |
| 2016/0117141 A1 | 4/2016 | Ro et al. | |
| 2016/0119464 A1 | 4/2016 | Kim | |
| 2016/0139776 A1 | 5/2016 | Donahue et al. | |
| 2016/0162243 A1 | 6/2016 | Neisler et al. | |
| 2016/0188275 A1 | 6/2016 | Huang | |
| 2016/0216782 A1 | 7/2016 | Lin et al. | |
| 2016/0239110 A1 | 8/2016 | Chen et al. | |
| 2016/0320937 A1 | 11/2016 | Zhou | |
| 2016/0342319 A1 | 11/2016 | Wang et al. | |
| 2016/0343350 A1 | 11/2016 | Khoury et al. | |
| 2017/0017454 A1* | 1/2017 | Kim | G06F 3/04845 |
| 2017/0031582 A1 | 2/2017 | Palandro et al. | |
| 2017/0052685 A1 | 2/2017 | Kovács et al. | |
| 2017/0199715 A1 | 7/2017 | Manchinasetti et al. | |
| 2017/0228207 A1* | 8/2017 | Szeto | G06F 3/0416 |
| 2017/0277381 A1 | 9/2017 | Allyn | |
| 2017/0315702 A1 | 11/2017 | Tsao et al. | |
| 2017/0351472 A1 | 12/2017 | Passeri et al. | |
| 2018/0070122 A1 | 3/2018 | Baek et al. | |
| 2018/0077547 A1* | 3/2018 | Sanchez Barajas | H04W 4/023 |
| 2018/0095623 A1 | 4/2018 | Haggar et al. | |
| 2018/0098018 A1 | 4/2018 | Cho et al. | |
| 2018/0107358 A1 | 4/2018 | Chodakowski et al. | |
| 2018/0129364 A1 | 5/2018 | Louch et al. | |
| 2018/0189972 A1 | 7/2018 | Humbert et al. | |
| 2018/0253207 A1 | 9/2018 | Wang et al. | |
| 2018/0324567 A1 | 11/2018 | Mao | |
| 2019/0069018 A1* | 2/2019 | Loman | G06F 3/04842 |
| 2019/0098204 A1 | 3/2019 | Chen et al. | |
| 2019/0110100 A1 | 4/2019 | Gao et al. | |
| 2019/0196707 A1 | 6/2019 | Szeto et al. | |
| 2019/0200203 A1 | 6/2019 | Jiang | |
| 2019/0222631 A1 | 7/2019 | Li et al. | |
| 2019/0265941 A1 | 8/2019 | Baba | |
| 2019/0286032 A1 | 9/2019 | Suzuki | |
| 2019/0295498 A1 | 9/2019 | Lee et al. | |
| 2019/0303088 A1 | 10/2019 | Yuan | |
| 2019/0346986 A1 | 11/2019 | Nilo et al. | |
| 2019/0371003 A1 | 12/2019 | Lin et al. | |
| 2020/0004394 A1 | 1/2020 | Li et al. | |
| 2020/0019367 A1 | 1/2020 | Sun et al. | |
| 2020/0045235 A1 | 2/2020 | Ono | |
| 2020/0053417 A1* | 2/2020 | Choi | H04N 21/631 |
| 2020/0192564 A1 | 6/2020 | Zhu et al. | |
| 2020/0233548 A1* | 7/2020 | Baker | G06F 3/0482 |
| 2020/0249825 A1* | 8/2020 | Chen | G06T 11/60 |
| 2020/0257425 A1 | 8/2020 | Ye | |
| 2020/0388051 A1 | 12/2020 | Lin et al. | |
| 2020/0409541 A1 | 12/2020 | Luo et al. | |
| 2021/0004220 A1 | 1/2021 | Hao et al. | |
| 2021/0027742 A1 | 1/2021 | Li | |
| 2021/0064191 A1 | 3/2021 | Liao et al. | |
| 2021/0181939 A1 | 6/2021 | Lee et al. | |
| 2021/0240332 A1* | 8/2021 | Walkin | G06F 3/0485 |
| 2021/0263642 A1 | 8/2021 | Li | |
| 2021/0374982 A1* | 12/2021 | Velinov | G06T 7/507 |
| 2021/0405952 A1 | 12/2021 | Wang et al. | |
| 2022/0147228 A1 | 5/2022 | Yi et al. | |
| 2022/0164091 A1 | 5/2022 | Kang et al. | |
| 2022/0224968 A1 | 7/2022 | Wang et al. | |
| 2022/0229624 A1 | 7/2022 | Xiong et al. | |
| 2022/0229708 A1 | 7/2022 | Hu | |
| 2022/0253187 A1 | 8/2022 | Wang | |
| 2022/0279062 A1 | 9/2022 | Ye | |
| 2022/0291892 A1 | 9/2022 | Gu | |

(56) References Cited

U.S. PATENT DOCUMENTS

| | | | |
|---|---|---|---|
| 2022/0300153 A1 | 9/2022 | Gu et al. |
| 2022/0334855 A1 | 10/2022 | Meng |
| 2022/0342850 A1 | 10/2022 | Cao et al. |
| 2022/0391158 A1 | 12/2022 | Lemmens et al. |
| 2022/0413671 A1 | 12/2022 | Liu |
| 2023/0041287 A1 | 2/2023 | Tian et al. |
| 2023/0153274 A1 | 5/2023 | Liu |
| 2023/0176705 A1 | 6/2023 | Kwon et al. |
| 2023/0205393 A1 | 6/2023 | Yamada et al. |
| 2023/0244373 A1 | 8/2023 | Pan et al. |

FOREIGN PATENT DOCUMENTS

| | | | |
|---|---|---|---|
| CN | 101865656 A | 10/2010 |
| CN | 102333152 A | 1/2012 |
| CN | 102419689 A | 4/2012 |
| CN | 102523346 A | 6/2012 |
| CN | 102620713 A | 8/2012 |
| CN | 102646117 A | 8/2012 |
| CN | 102687117 A | 9/2012 |
| CN | 102945131 A | 2/2013 |
| CN | 103245337 A | 8/2013 |
| CN | 103279288 A | 9/2013 |
| CN | 103425408 A | 12/2013 |
| CN | 103873637 A | 6/2014 |
| CN | 103973979 A | 8/2014 |
| CN | 104137048 A | 11/2014 |
| CN | 104268251 A | 1/2015 |
| CN | 104349110 A | 2/2015 |
| CN | 104484144 A | 4/2015 |
| CN | 104811793 A | 7/2015 |
| CN | 105183343 A | 12/2015 |
| CN | 105512086 A | 4/2016 |
| CN | 105516754 A | 4/2016 |
| CN | 105549869 A | 5/2016 |
| CN | 105549870 A | 5/2016 |
| CN | 105556451 A | 5/2016 |
| CN | 105635948 A | 6/2016 |
| CN | 105681441 A | 6/2016 |
| CN | 105843470 A | 8/2016 |
| CN | 105892851 A | 8/2016 |
| CN | 105955689 A | 9/2016 |
| CN | 105979148 A | 9/2016 |
| CN | 105988686 A | 10/2016 |
| CN | 106055202 A | 10/2016 |
| CN | 106095237 A | 11/2016 |
| CN | 106354451 A | 1/2017 |
| CN | 106406127 A | 2/2017 |
| CN | 106507439 A | 3/2017 |
| CN | 106657651 A | 5/2017 |
| CN | 106844063 A | 6/2017 |
| CN | 106850165 A | 6/2017 |
| CN | 107085508 A | 8/2017 |
| CN | 107124690 A | 9/2017 |
| CN | 107222936 A | 9/2017 |
| CN | 107329927 A | 11/2017 |
| CN | 107425942 A | 12/2017 |
| CN | 107479784 A | 12/2017 |
| CN | 107491469 A | 12/2017 |
| CN | 107506039 A | 12/2017 |
| CN | 107846617 A | 3/2018 |
| CN | 107908489 A | 4/2018 |
| CN | 107943439 A | 4/2018 |
| CN | 108037972 A | 5/2018 |
| CN | 108123826 A | 6/2018 |
| CN | 108154538 A | 6/2018 |
| CN | 108228020 A | 6/2018 |
| CN | 108268640 A | 7/2018 |
| CN | 108399529 A | 8/2018 |
| CN | 108447097 A | 8/2018 |
| CN | 108600544 A | 9/2018 |
| CN | 108616561 A | 10/2018 |
| CN | 108647062 A | 10/2018 |
| CN | 108702414 A | 10/2018 |
| CN | 108717714 A | 10/2018 |
| CN | 108718439 A | 10/2018 |
| CN | 104618793 B | 11/2018 |
| CN | 108734736 A | 11/2018 |
| CN | 108762619 A | 11/2018 |
| CN | 108765498 A | 11/2018 |
| CN | 108781235 A | 11/2018 |
| CN | 108829323 A | 11/2018 |
| CN | 108874713 A | 11/2018 |
| CN | 108900764 A | 11/2018 |
| CN | 108958684 A | 12/2018 |
| CN | 108984137 A | 12/2018 |
| CN | 109099888 A | 12/2018 |
| CN | 109120970 A | 1/2019 |
| CN | 109164964 A | 1/2019 |
| CN | 109462692 A | 3/2019 |
| CN | 109525697 A | 3/2019 |
| CN | 109644263 A | 4/2019 |
| CN | 109669747 A | 4/2019 |
| CN | 109690967 A | 4/2019 |
| CN | 109739450 A | 5/2019 |
| CN | 109753215 A | 5/2019 |
| CN | 109803126 A | 5/2019 |
| CN | 208849986 U | 5/2019 |
| CN | 109889885 A | 6/2019 |
| CN | 109922205 A | 6/2019 |
| CN | 110109636 A | 8/2019 |
| CN | 110113538 A | 8/2019 |
| CN | 110221798 A | 9/2019 |
| CN | 110243386 A | 9/2019 |
| CN | 110267073 A | 9/2019 |
| CN | 110278338 A | 9/2019 |
| CN | 110321093 A | 10/2019 |
| CN | 110333814 A | 10/2019 |
| CN | 110363819 A | 10/2019 |
| CN | 110417992 A | 11/2019 |
| CN | 110443853 A | 11/2019 |
| CN | 110471639 A | 11/2019 |
| CN | 110473262 A | 11/2019 |
| CN | 110489042 A | 11/2019 |
| CN | 110515576 A | 11/2019 |
| CN | 110515579 A | 11/2019 |
| CN | 110515580 A | 11/2019 |
| CN | 110557674 A | 12/2019 |
| CN | 110574359 A | 12/2019 |
| CN | 110597473 A | 12/2019 |
| CN | 110602805 A | 12/2019 |
| CN | 110618970 A | 12/2019 |
| CN | 110673782 A | 1/2020 |
| CN | 110703966 A | 1/2020 |
| CN | 107925694 B | 2/2020 |
| CN | 110750197 A | 2/2020 |
| CN | 110806831 A | 2/2020 |
| CN | 110851040 A | 2/2020 |
| CN | 110908625 A | 3/2020 |
| CN | 111062778 A | 4/2020 |
| CN | 111079550 A | 4/2020 |
| CN | 111107222 A | 5/2020 |
| CN | 111125526 A | 5/2020 |
| CN | 111158540 A | 5/2020 |
| CN | 111190559 A | 5/2020 |
| CN | 111221491 A | 6/2020 |
| CN | 111240547 A | 6/2020 |
| CN | 111240575 A | 6/2020 |
| CN | 111290675 A | 6/2020 |
| CN | 111314768 A | 6/2020 |
| CN | 111324327 A | 6/2020 |
| CN | 111327769 A | 6/2020 |
| CN | 111399789 A | 7/2020 |
| CN | 111399959 A | 7/2020 |
| CN | 111443884 A | 7/2020 |
| CN | 111666055 A | 9/2020 |
| CN | 111782427 A | 10/2020 |
| CN | 111858522 A | 10/2020 |
| CN | 111949350 A | 11/2020 |
| CN | 112083867 A | 12/2020 |
| CN | 112148182 A | 12/2020 |
| CN | 112527221 A | 3/2021 |
| CN | 111666055 B | 12/2021 |
| CN | 114356198 A | 4/2022 |

(56) References Cited

FOREIGN PATENT DOCUMENTS

| | | |
|---|---|---|
| EP | 2632188 A1 | 8/2013 |
| EP | 4080345 A1 | 10/2022 |
| EP | 4095671 A1 | 11/2022 |
| EP | 4177725 A1 | 5/2023 |
| JP | 2012063865 A | 3/2012 |
| JP | 2018097880 A | 6/2018 |
| KR | 20110076153 A | 7/2011 |
| KR | 20180042643 A | 4/2018 |
| WO | 0203186 A2 | 1/2002 |
| WO | 2015197908 A1 | 12/2015 |
| WO | 2018120884 A1 | 7/2018 |
| WO | 2019071872 A1 | 4/2019 |
| WO | 2022256681 A2 | 12/2022 |

OTHER PUBLICATIONS

Wang Changhong, "Try the remote projection function," Computer Knowledge and Technology (Experience Skills), Issue 11, 2018, with an English translation, 6 pages.

Marquardt Nicolai et al: "Gradual engagement facilitating information exchange between digital devices as a function of proximity," Proceedings of the Third ACM Conference on Data and Application Security and Privacy, CODASPY"13, ACM Press, New York, New York, USA, Nov. 11, 2012, pp. 31-40, XP058985017, 10 pages total.

Yang Bowen et al, Camera Calibration Technique of Wide-Area Vision Measurement, Acta Optica Sinica, vol. 32, No. 9, with the English Abstract, 9 pages.

* cited by examiner

CROSS-DEVICE OBJECT DRAG METHOD AND DEVICE

CROSS-REFERENCE TO RELATED APPLICATIONS

This is a national stage of International Patent Application No. PCT/CN2021/108579 filed Jul. 27, 2021, which claims priority to Chinese Patent Application No. 202010747173.5 filed Jul. 29, 2020. Both of the aforementioned applications are hereby incorporated by reference in their entireties.

TECHNICAL FIELD

This application relates to the field of electronic devices, and in particular, to a cross-device object drag method and device.

BACKGROUND

With development of electronic technologies and the mobile Internet, a user may simultaneously have more terminals such as a mobile phone, a tablet computer, a personal computer (personal computer, PC), and a smart home device (for example, a television). Generally, each terminal is used independently. In a scenario in which a plurality of terminals need to be collaboratively used, for example, a scenario of collaborative office, the user connects the plurality of terminals for use. For example, a user with a PC and a mobile phone can connect the PC and the mobile phone for collaborative use in a wireless or wired manner, to implement collaborative office between the PC and the mobile phone.

As shown in FIG. 1, in a scenario of collaborative office between a PC and a mobile phone, multi-screen collaboration implements projection of an interface (for example, a desktop 101 of the mobile phone shown in FIG. 1) of the mobile phone to a display of the PC for display in a screen mirroring projection manner, to facilitate collaborative office for a user. In a projection state, currently, multi-screen collaboration may further implement a bidirectional content drag function between a PC and a mobile phone by using an input device (or referred to as a peripheral) such as a mouse or a touchscreen. In other words, a user is allowed to transfer a text or a file between a PC and a mobile phone in a drag manner by using an input device (like a mouse or a touch-screen) during projection.

However, in a scenario in which collaborative office between a PC and a mobile phone is implemented through multi-screen collaboration, a prerequisite for implementing a content drag is that an interface of the mobile phone is projected to a display of the PC for display, and the mobile phone is usually screen-off. Hardware capabilities such as a touchscreen and a stylus of the mobile phone cannot participate in collaborative office. In addition, an interface projected from the mobile phone to the PC greatly occupies display space of the display of the PC. This reduces usage efficiency of collaboratively using a plurality of terminals.

SUMMARY

Embodiments of this application provide a cross-device object drag method and device, to improve usage efficiency of collaboratively using a plurality of terminals.

To achieve the foregoing objective, the following technical solutions are used in embodiments of this application.

According to a first aspect of this application, a cross-device object drag method is provided, where the method may be applied to a second terminal, and the second terminal is connected to a first terminal. The method may include: a second terminal displays, on a display of the second terminal, an object dragged from the first terminal; the second terminal displays a second cursor on the object; the second terminal receives a motion operation input by a user by using an input device of the first terminal; and the second terminal displays, on the display of the second terminal based on the motion operation, an animation in which the object moves with the second cursor.

When the foregoing technical solution is used, on a premise that projection is not started, the user can shuttle, with the cursor in a drag manner by using the input device, for example, a mouse, an object on one terminal between the plurality of terminals that are collaboratively used. Because projection does not need to be started, no display space of a display of a terminal is occupied. In addition, this improves usage efficiency of collaboratively using a plurality of terminals, and improves user experience.

In an example, the input device of the first terminal may be a mouse, a touchpad, or the like. The second cursor may be a cursor displayed on the display of the second terminal.

In a possible implementation, before the second terminal displays, on the display of the second terminal, the object dragged from the first terminal, the method may further include: the second terminal receives shuttle state information from the first terminal, where the shuttle state information is used to indicate that a shuttle starts.

In another possible implementation, that a second terminal displays, on a display of the second terminal, an object dragged from a first terminal may include: the second terminal receives drag data from the first terminal, and the second terminal displays, on the display of the second terminal based on the drag data, the object dragged from the first terminal. The drag data and the motion operation are sent to the second terminal by the first terminal after the first terminal determines that the object is dragged out from an edge of a display of the first terminal when the object moves with a first cursor on the display of the first terminal. The drag data and the motion operation are used to dispatch a drag event for the object. Drag data related to the dragged object is sent to other terminals, so that the user can process the transferred object by using these terminals. In other words, hardware capabilities of the plurality of terminals can all participate in collaborative office. The first cursor may be a cursor displayed on the display of the first terminal.

In another possible implementation, the method may further include: the second terminal generates a press operation. That the second terminal displays, on the display of the second terminal based on the motion operation, an animation in which the object moves with the second cursor may include: the second terminal displays, on the display of the second terminal based on the motion operation, the press operation, and the drag data, the animation in which the object moves with the second cursor. After the object is dragged out from the edge of the display of the first terminal, the cursor shuttles. After the cursor shuttles, the second terminal implements drag connection based on the operation input by the user by using the input device of the first terminal.

In another possible implementation, that the second terminal generates a press operation may include: the second terminal simulates the press event according to an operation parameter of the press operation. That the second terminal receives a motion operation input by a user by using an input device of the first terminal may include: the second terminal receives an operation parameter from the first terminal, and simulates a motion event based on the operation parameter, where the operation parameter is an operation parameter included in a motion event received by the first terminal after the user performs the motion operation by using the input device of the first terminal. That the second terminal displays, on the display of the second terminal based on the motion operation, the press operation, and the drag data, the animation in which the object moves with the second cursor includes: the second terminal displays, on the display of the second terminal in response to the press event and the motion event based on the drag data, the animation in which the object moves with the second cursor.

In another possible implementation, the method may further include: the second terminal creates a virtual input device after the connection to the first terminal is successfully established; or the second terminal receives a notification message from the first terminal, where the notification message is used to indicate that a keyboard and mouse sharing mode of the first terminal is enabled, and the second terminal creates the virtual input device in response to the notification message, where the virtual input device is used by the second terminal to simulate an input event according to an operation parameter. With the help of a keyboard and mouse sharing technology, that an object is dragged between a plurality of terminals by using an input device of one terminal is implemented.

In another possible implementation, that a second terminal displays, on a display of the second terminal, an object dragged from a first terminal includes: the second terminal displays, on the display of the second terminal, a shadow of the object dragged from the first terminal. That the second terminal displays, on the display of the second terminal based on the motion operation, an animation in which the object moves with the second cursor may include: the second terminal displays, on the display of the second terminal based on the motion operation, the animation in which the shadow of the object moves with the second cursor.

In another possible implementation, the object may be a text, a file, or a folder; and the drag data may include drag event content and a bitmap of the shadow. When the object is the text, the drag event content includes the text; or when the object is the file or the folder, the drag event content is a file path.

In another possible implementation, after the second terminal receives drag data from the first terminal, the method may further include: the second terminal creates an invisible activity, where the invisible activity has a view control whose transparency is greater than a threshold, and the view control is used to dispatch the drag event.

In another possible implementation, the object is an icon of an application; or the object is a window, and the window includes an interface of an application. When the object is the icon of the application, the drag data includes the icon of the application; or when the object is the window, the drag data includes the interface of the application.

According to a second aspect of this application, a cross-device object drag method is provided, where the method may be applied to a first terminal, and first terminal is connected to a second terminal. The method may include: the first terminal displays a first cursor on an object displayed on the first terminal; the first terminal receives a drag operation input by a user by using an input device of the first terminal, where the drag operation is used to dispatch a drag for the object; the first terminal displays, on a display of the first terminal in response to the drag operation, an animation in which the object moves with the first cursor; and the first terminal sends drag data to the second terminal when determining that the object is dragged out from an edge of the display of the first terminal.

In an example, the input device of the first terminal may be a mouse, a touchpad, or the like. The first cursor may be a cursor displayed on the display of the first terminal.

When the foregoing technical solution is used, on a premise that projection is not started, the user can shuttle, with the cursor in a drag manner by using the input device, for example, a mouse, an object on one terminal between the plurality of terminals that are collaboratively used. Because projection does not need to be started, no display space of a display of a terminal is occupied. In addition, drag data related to the dragged object is sent to other terminals, and is used by the other terminals to continue the drag; and the user is allowed to process the transferred object by using these terminals. In other words, hardware capabilities of the plurality of terminals can all participate in collaborative office. This improves usage efficiency of collaboratively using a plurality of terminals, and improves user experience.

In a possible implementation, the drag data may be used by the second terminal to dispatch a drag event for the object, so that the second terminal displays, on a display of the second terminal, an animation in which the object moves with a second cursor. The second cursor may be a cursor displayed on the display of the second terminal. The drag data is sent to another terminal, so that the another terminal can continue to display, on the another terminal based on an operation input by the user, the animation in which the object moves with the cursor. In this way, drag connection is implemented.

In another possible implementation, the drag operation may include a press operation and a motion operation. When the first terminal determines that the object is dragged out from the edge of the display of the first terminal, the method may further include: the first terminal sends, to the second terminal, data of the motion operation input by the user by using the input device of the first terminal. After the object is dragged out from the edge of the display of the first terminal, the cursor shuttles. After the cursor shuttles, the first terminal sends, to another terminal, the data of the motion operation input by the user by using the input device of the first terminal, so that the another terminal implements drag connection.

In another possible implementation, that the first terminal sends, to the second terminal, data of the motion operation input by the user by using the input device of the first terminal may include: the first terminal intercepts a motion event in a process in which the user performs the motion operation by using the input device of the first terminal; and the first terminal sends, to the second terminal, an operation parameter included in the motion event.

In another possible implementation, after the first terminal determines that the object is dragged out from the edge of the display of the first terminal, the method may further include: the first terminal sends shuttle state information to the second terminal, where the shuttle state information is used to indicate that a shuttle starts. After the object is dragged out from the edge of the display of the first terminal, it is determined that the cursor shuttles. The shuttle state information used to indicate that the shuttle starts is sent to another terminal, so that the another terminal prepares to continue the drag, for example, displays the cursor.

In another possible implementation, that the first terminal displays, on a display of the first terminal, an animation in which the object moves with the first cursor may include: the first terminal displays, on the display of the first terminal, an animation in which a shadow of the object moves with the first cursor.

In another possible implementation, after the first terminal determines that the object is dragged out from the edge of the display of the first terminal, the method may further include: the first terminal hides the first cursor and the shadow of the object. After it is determined that the cursor shuttles, the cursor displayed on the first terminal and the shadow of the dragged object are hidden, to give the user a visual effect that the object is dragged from the first terminal to another terminal.

In another possible implementation, the object may be a text, a file, or a folder; and the drag data may include drag event content and a bitmap of the shadow. When the object is the text, the drag event content includes the text; or when the object is the file or the folder, the drag event content is a file path.

In another possible implementation, after the first terminal determines that the object is dragged out from the edge of the display of the first terminal, the method may further include: the first terminal displays an invisible window, where transparency of the invisible window is greater than a threshold, and the invisible window is used to receive the drag event. Before sending the drag data to the second terminal, the method may further include: the first terminal obtains the drag event content from the drag event that is received by the invisible window; and the first terminal obtains the bitmap of the shadow.

In another possible implementation, the object is an icon of an application; or the object is a window, and the window includes an interface of an application. When the object is the icon of the application, the drag data includes the icon of the application; or when the object is the window, the drag data includes the interface of the application.

According to a third aspect of this application, a cross-device object drag apparatus is provided, where the apparatus is applied to a first terminal, and first terminal is connected to a second terminal. The apparatus may include: a display unit, an input unit, and a sending unit. The display unit is configured to display a first cursor on an object displayed on the first terminal. The input unit is configured to receive a drag operation input by a user by using an input device of the first terminal, where the drag operation is used to dispatch a drag for the object. The display unit is further configured to: display, on a display of the first terminal in response to the drag operation, an animation in which the object moves with the first cursor. The sending unit is configured to: when it is determined that the object is dragged out from an edge of the display of the first terminal, send drag data to the second terminal.

In a possible implementation, the drag data is used by the second terminal to dispatch a drag event for the object, so that the second terminal displays, on a display of the second terminal, an animation in which the object moves with a second cursor.

In another possible implementation, the drag operation may include a press operation and a motion operation. The sending unit is further configured to: send, to the second terminal, data of the motion operation input by the user by using the input device of the first terminal.

In another possible implementation, the apparatus may further include an interception unit. The interception unit is configured to: intercept a motion event in a process in which the user performs the motion operation by using the input device of the first terminal. The sending unit is specifically configured to: send, to the second terminal, an operation parameter included in the motion event.

In another possible implementation, the sending unit is further configured to send shuttle state information to the second terminal, where the shuttle state information is used to indicate that a shuttle starts.

In another possible implementation, the display unit is specifically configured to: display, on the display of the first terminal, an animation in which a shadow of the object moves with the first cursor.

In another possible implementation, the display unit is further configured to hide the first cursor and the shadow of the object.

In another possible implementation, the object is a text, a file, or a folder; and the drag data includes drag event content and a bitmap of the shadow. When the object is the text, the drag event content includes the text; or when the object is the file or the folder, the drag event content is a file path.

In another possible implementation, the display unit is further configured to display an invisible window, where transparency of the invisible window is greater than a threshold, and the invisible window is used to receive the drag event. The apparatus may further include an obtaining unit. The obtaining unit is configured to: obtain the drag event content from the drag event that is received by the invisible window, and obtain the bitmap of the shadow.

In another possible implementation, the object is an icon of an application; or the object is a window, and the window includes an interface of an application. When the object is the icon of the application, the drag data includes the icon of the application; or when the object is the window, the drag data includes the interface of the application.

According to a fourth aspect of this application, a cross-device object drag apparatus is provided, where the apparatus is applied to a second terminal, and the second terminal is connected to a first terminal. The apparatus may include: a display unit and a receiving unit. The display unit is configured to: display, on a display of the second terminal, an object dragged from the first terminal; and display a second cursor on the object. The receiving unit is configured to receive a motion operation input by a user by using an input device of the first terminal. The display unit is further configured to: display, on the display of the second terminal based on the motion operation, an animation in which the object moves with the second cursor.

In a possible implementation, the apparatus further includes: the receiving unit is further configured to receive shuttle state information from the first terminal, where the shuttle state information is used to indicate that a shuttle starts.

In another possible implementation, the receiving unit is further configured to receive drag data from the first terminal. The display unit is specifically configured to: display, on the display of the second terminal based on the drag data, the object dragged from the first terminal. The drag data and the motion operation are sent to the second terminal by the first terminal after the first terminal determines that the object is dragged out from an edge of a display of the first terminal when the object moves with the first cursor on the display of the first terminal. The drag data and the motion operation are used to dispatch a drag event for the object.

In another possible implementation, the apparatus may further include a generation unit. The generation unit is configured to generate a press operation. The display unit is specifically configured to: display, on the display of the second terminal based on the motion operation, the press operation, and the drag data, an animation in which the object moves with the second cursor.

In a possible implementation, the generation unit is specifically configured to simulate the press event according to an operation parameter of the press operation. The receiving unit is specifically configured to receive an operation parameter from the first terminal. The generation unit is further configured to simulate a motion event according to the operation parameter, where the operation parameter is an operation parameter included in a motion event received by the first terminal after the user performs the motion operation by using the input device of the first terminal. The display unit is specifically configured to: display, on the display of the second terminal in response to the press event and the motion event based on the drag data, the animation in which the object moves with the second cursor.

In another possible implementation, the apparatus may further include a creation unit. The creation unit is configured to: create a virtual input device after the connection to the first terminal is successfully established. Alternatively, the receiving unit is further configured to receive a notification message from the first terminal, where the notification message is used to indicate that a keyboard and mouse sharing mode of the first terminal is enabled; and the creation unit is configured to: create the virtual input device in response to the notification message, where the virtual input device is used by the second terminal to simulate an input event according to an operation parameter.

In another possible implementation, the display unit is specifically configured to: display, on the display of the second terminal, a shadow of the object dragged from the first terminal. The display unit is specifically configured to: display, on the display of the second terminal based on the motion operation, an animation in which the shadow of the object moves with the second cursor.

In another possible implementation, the object may be a text, a file, or a folder; and the drag data includes drag event content and a bitmap of the shadow. When the object is the text, the drag event content includes the text; or when the object is the file or the folder, the drag event content is a file path.

In another possible implementation, the creation unit is further configured to create an invisible activity, where the invisible activity has a view control whose transparency is greater than a threshold, and the view control is used to dispatch the drag event.

In another possible implementation, the object is an icon of an application; or the object is a window, and the window includes an interface of an application. When the object is the icon of the application, the drag data includes the icon of the application; or when the object is the window, the drag data includes the interface of the application.

According to a fifth aspect of this application, a cross-device object drag apparatus is provided, including a processor and a memory configured to store executable instructions of the processor. The processor is configured to implement, when executing the instructions, the method according to the first aspect or any possible implementation of the first aspect, or implementing the method according to the second aspect or any possible implementation of the second aspect.

According to a sixth aspect of this application, a computer-readable storage medium is provided, where computer program instructions are stored on the computer-readable storage medium. When the computer program instructions are executed by a processor, the method according to the first aspect or any possible implementation of the first aspect is implemented, or the method according to the second aspect or any possible implementation of the second aspect is implemented.

According to a seventh aspect of this application, a terminal is provided. The terminal includes a display, one or more processors, and a memory. The display and the processor are coupled to the memory. The memory is configured to store computer program code, where the computer program code includes computer instructions. When the computer instructions are executed by a terminal, the terminal is enabled to perform the method according to the first aspect or any possible implementation of the first aspect; or the terminal is enabled to perform the method according to the second aspect or any possible implementation of the second aspect.

According to an eighth aspect of this application, a computer program product is provided, including computer-readable code or a non-volatile computer-readable storage medium carrying computer-readable code. When the computer-readable code runs on a terminal, a processor in the terminal performs the method according to the first aspect or any possible implementation of the first aspect, or performs the method according to the second aspect or any possible implementation of the second aspect.

According to a ninth aspect of this application, a cross-device object drag system is provided. The system may include a first terminal and a second terminal, where the first terminal is connected to the second terminal.

The first terminal displays a first cursor on an object displayed on the first terminal, and receives a drag operation input by a user by using an input device of the first terminal, where the drag operation is used to dispatch a drag for the object. The first terminal displays, on a display of the first terminal in response to the drag operation, an animation in which the object moves with the first cursor; and sends, to the second terminal when determining that the object is dragged out from an edge of the display of the first terminal, drag data and a motion operation that is input by the user by using the input device of the first terminal. The second terminal displays, on a display of the second terminal based on the drag data, the object dragged from the first terminal; and displays a second cursor on the object. The second terminal receives the motion operation input by the user by using the input device of the first terminal. The second terminal displays, on the display of the second terminal based on the motion operation, an animation in which the object moves with the second cursor.

In a possible implementation, after determining that the object is dragged out from the edge of the display of the first terminal, the first terminal sends shuttle state information to the second terminal, where the shuttle state information is used to indicate that a shuttle starts.

In another possible implementation, after determining that the object is dragged out from the edge of the display of the first terminal, the first terminal hides the first cursor and the object.

It should be noted that, in this embodiment, that the object is dragged out from the edge of the display of the terminal (for example, the first terminal) may be that a partial area of the object is dragged out from (or overflows) the display of the terminal, or may be that an entire area of the object is dragged out from (or overflows) the display of the terminal, or may further be that a cursor slides out of the edge of the display of the terminal when the object moves with the cursor on the display of the terminal. This is not specifically limited in this embodiment.

It may be understood that, for beneficial effects that can be achieved by the cross-device object drag apparatus according to the third aspect and any possible implementation of the third aspect, the cross-device object drag apparatus according to the fourth aspect and any possible implementation of the fourth aspect, the cross-device object drag apparatus according to the fifth aspect, the computer-readable storage medium according to the sixth aspect, the terminal according to the seventh aspect, the computer program product according to the eighth aspect, and the cross-device object drag system according to the ninth aspect, refer to the beneficial effects in the first aspect or the second aspect and any possible implementation of the first aspect or the second aspect. Details are not described herein again.

DESCRIPTION OF EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

In a current technology, when multi-screen collaboration is used to implement multi-terminal collaborative office, for example, collaborative office between a PC and a mobile phone, a prerequisite for implementing a content drag is that an interface of the mobile phone is projected to a display of the PC for display. In addition, both a content drag and content processing are completed by using hardware of the PC. The mobile phone is usually screen-off, and hardware capabilities (such as a display and a stylus) of the mobile phone cannot participate in collaborative office. Consequently, it is difficult for a user to comprehensively use features of different terminals, that participate in collaborative office, to promote strengths, avoid weaknesses, and maximize work efficiency. In addition, an interface projected from the mobile phone to the PC greatly occupies display space of the display of the PC. This affects usage efficiency of collaboratively using a plurality of terminals.

Embodiments of this application provide a cross-device object drag method and device, and the method may be applied to a scenario in which a plurality of terminals are cooperatively used. According to the method provided in the embodiments, on a premise that projection is not started, and when a keyboard and mouse sharing technology is used, a user can use an input device, such as a touchpad or a mouse, to mutually transfer content (or an object), such as a text or a file, in a drag manner between the plurality of terminals that are collaboratively used. In addition, the user is allowed to process the transferred content by using these terminals. In other words, hardware capabilities of the plurality of terminals can all participate in collaborative office. In addition, because projection does not need to be started, no display space of a display of a terminal is occupied. This improves usage efficiency of collaboratively using a plurality of terminals, and improves user experience.

The following describes implementations of embodiments of this application in detail with reference to the accompanying drawings.

Figure 1:
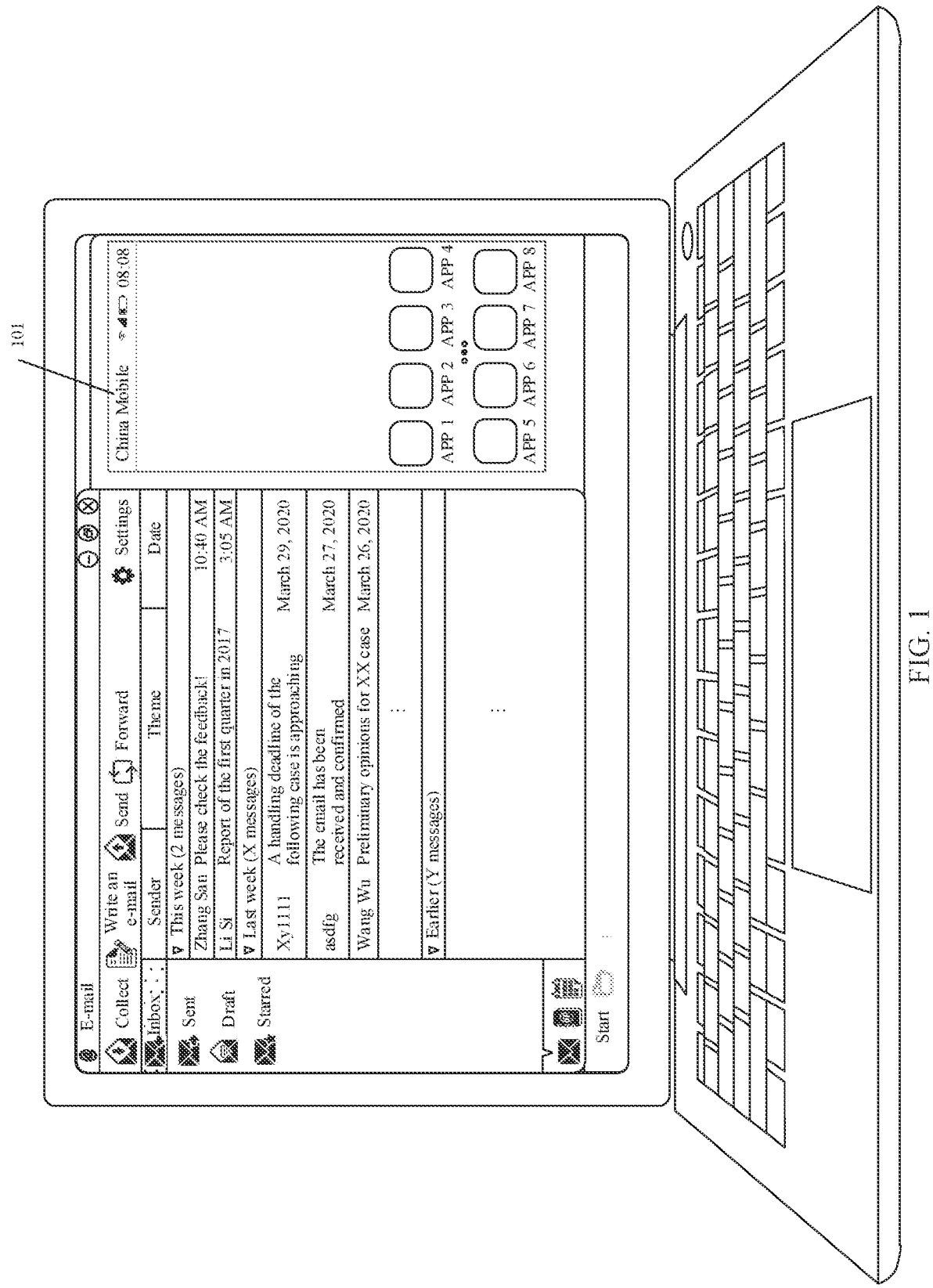
FIG. 1 is a schematic diagram of a collaborative office scenario according to a current technology.
Figure 2:
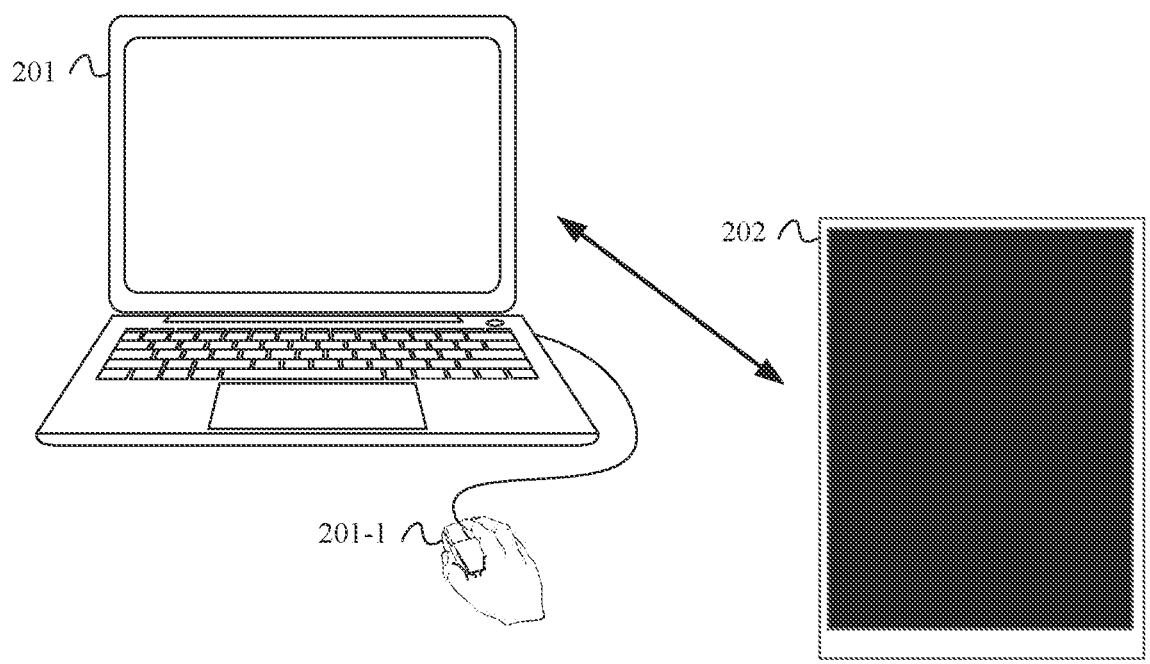
FIG. 2 is a simplified schematic diagram of a system architecture according to an embodiment of this application.

FIG. 2 is a simplified schematic diagram of a system architecture to which the foregoing method may be applied according to an embodiment of this application. The system architecture may be a cross-device object drag system in this embodiment. As shown in FIG. 2, the system architecture may include at least a first terminal 201 and a second terminal 202.

The first terminal 201 is connected to an input device 201-1 (as shown in FIG. 2), or includes an input device 201-1 (not shown in FIG. 2). In an example, the input device 201-1 may be a mouse, a touchpad, a touchscreen, or the like. In FIG. 2, an example in which the input device 201-1 is a mouse is used for illustration.

In this embodiment, the first terminal 201 and the second terminal 202 may establish a connection in a wired or wireless manner. Based on the established connection, the first terminal 201 and the second terminal 202 may be cooperatively used together. In this embodiment, a wireless communication protocol used when the first terminal 201 and the second terminal 202 establish the connection in a wireless manner may be a wireless fidelity (wireless fidelity, Wi-Fi) protocol, a Bluetooth (Bluetooth) protocol, a ZigBee protocol, a near field communication (Near Field Communication, NFC) protocol, or the like. The wireless communication protocol may further be various cellular network protocols. This is not specifically limited herein.

After the first terminal 201 is connected to the second terminal 202, and w % ben a keyboard and mouse sharing technology is used, a user may control both the first terminal 201 and the second terminal 202 by using one input device, for example, the foregoing input device 201-1. In other words, the user may control the first terminal 201 by using the input device 201-1 of the first terminal 201, and the first terminal 201 may further share the input device 201-1 of the first terminal 201 to the second terminal 202, so that the user controls the second terminal 202.

For example, in this embodiment of this application, an example in which the input device 201-1 is a mouse is used. After the first terminal 201 is connected to the second terminal 202, on a premise that projection is not started, and when the keyboard and mouse sharing technology is used, the user may drag content of the first terminal 201, such as a text or a file, to the second terminal 202 in a drag manner by using the mouse. The user may further drag the content, for example, a text or a file of the second terminal 202, to the first terminal 201 in a drag manner by using the mouse.

It should be noted that, in this embodiment of this application, on a premise that projection is not started, a content drag between two terminals can be implemented, and a content drag between three or more terminals can be further implemented. For example, when the second terminal 202 further establishes a connection to another device, for example, a device referred to as a third terminal, in this embodiment of this application, on a premise that projection is not started, and when the keyboard and mouse sharing technology is used, the user drags content, such as a text or a file, from one terminal to another terminal. Then, the user may continue to drag the content to the third terminal in a drag manner. For example, the example in which the input device 201-1 is a mouse is still used. On a premise that projection is not started, the user drags content, for example, a text or a file of the first terminal 201, to the second terminal 202 in a drag manner by using the mouse. Then, the user may continue to drag the content to the third terminal in a drag manner. After the user releases the mouse, the content drag is complete.

It should be noted that the terminal in this embodiment of this application, for example, the first terminal 201, the second terminal 202, or the third terminal, may be a mobile phone, a tablet computer, a handheld computer, a PC, a cellular phone, a personal digital assistant (personal digital assistant, PDA), a wearable device (for example, a smart watch), a smart home device (for example, a television), a vehicle-mounted computer, a game console, an augmented reality (augmented reality, AR)/virtual reality (virtual reality, VR) device, or the like. A specific form of the terminal is not specially limited in this embodiment. In FIG. 2, an example in which the first terminal 201 is a PC and the second terminal 202 is a tablet computer is used for illustration.

Figure 3:
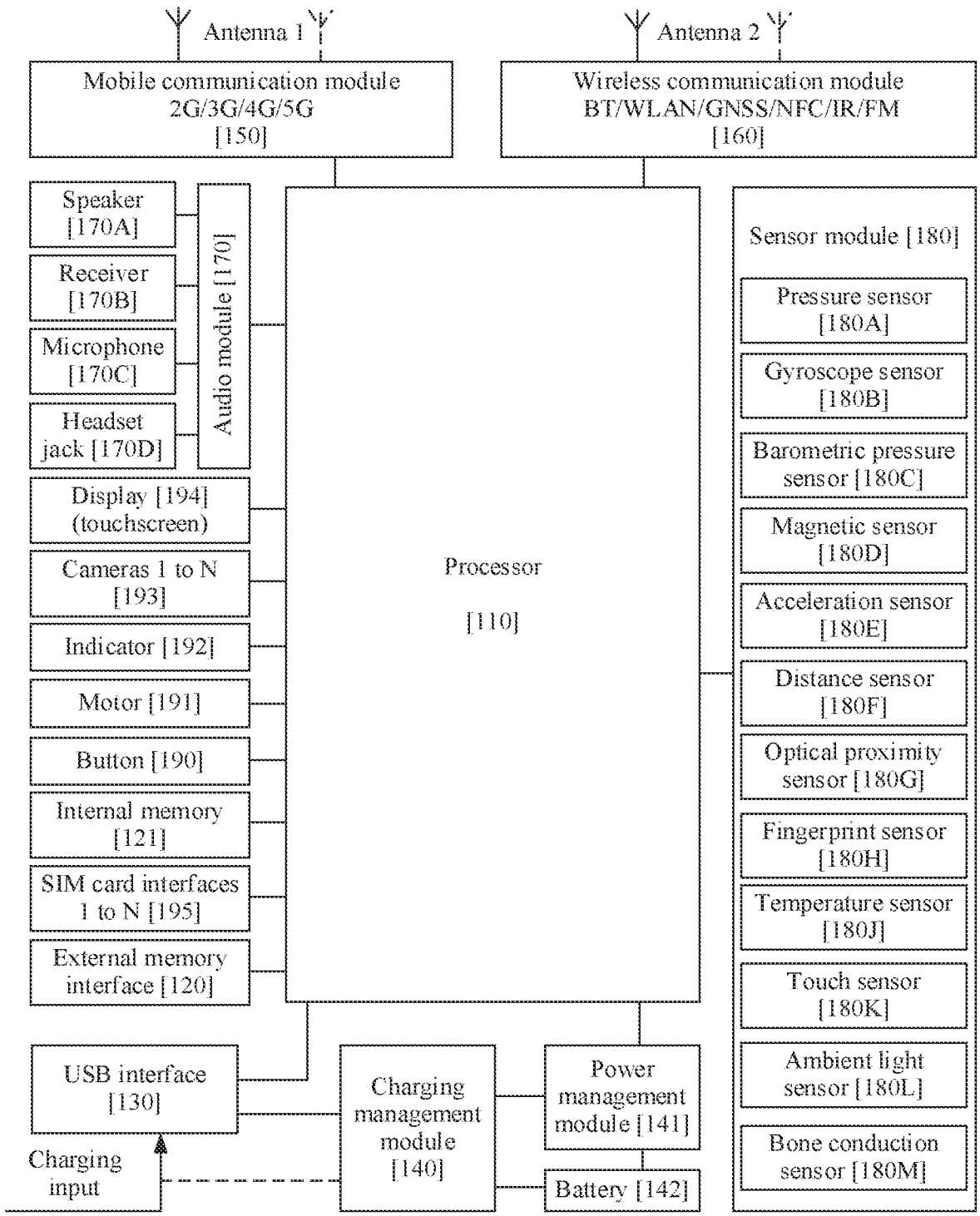
FIG. 3 is a schematic diagram of a structure of a tablet computer according to an embodiment of this application.

In this embodiment, an example in which a terminal is a tablet computer is used. FIG. 3 is a schematic diagram of a structure of a tablet computer according to an embodiment of this application. A method in the following embodiment may be implemented in a tablet computer having the foregoing hardware structure.

As shown in FIG. 3, the tablet computer may include a processor 110, an external memory interface 120, an internal memory 121, a universal serial bus (universal serial bus, USB) interface 130, a charging management module 140, a power management module 141, a battery 142, an antenna 1, an antenna 2, a wireless communication module 160, an audio module 170, a speaker 170A, a receiver 170B, a microphone 170C, a headset jack 170D, a sensor module 180, a button 190, a motor 191, an indicator 192, a camera 193, a display 194, and the like. Optionally, the tablet computer may further include a mobile communication module 150, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment does not constitute a specific limitation on the tablet computer. In some other embodiments, the tablet computer may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the tablet computer. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface, MIPI), a general-purpose input/output (general-purpose input/output, GPIO) interface, a SIM interface, a USB interface, and/or the like.

The charging management module 140 is configured to receive a charging input from a charger. When charging the battery 142, the charging management module 140 may further supply power to the tablet computer by using the power management module 141. The power management module 141 is configured to connect to the battery 142, the charging management module 140, and the processor 110.

The power management module 141 may also receive an input from the battery 142, to supply power to the tablet computer.

A wireless communication function of the tablet computer may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the tablet computer may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

When the tablet computer includes the mobile communication module 150, the mobile communication module 150 may provide a solution to wireless communication that includes 2G/3G/4G/5G or the like and that is applied to the tablet computer. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the tablet computer and that includes a wireless local area network (wireless local area networks, WLAN) (for example, a Wi-Fi network), Bluetooth (Bluetooth. BT), a global navigation satellite system (global navigation satellite system, GNSS), frequency modulation (frequency modulation, FM), NFC, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the tablet computer, the antenna 1 and the mobile communication module 150 are coupled, and the antenna 2 and the wireless communication module 160 are coupled, so that the tablet computer can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The tablet computer implements a display function by using the GPU, the display 194, the application processor, and the like. The GPU is a microprocessor for image processing, and is connected to the display 194 and the application processor. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the tablet computer may include one or N displays 194, where N is a positive integer greater than 1.

The tablet computer may implement a photographing function by using the ISP, the camera 193, the video codec, the GPU, the display 194, the application processor, and the like. In some embodiments, the tablet computer may include one or N cameras 193, where N is a positive integer greater than 1.

The external memory interface 120 may be configured to connect to an external storage card, for example, a micro SD card, to extend a storage capability of the tablet computer. The external storage card communicates with the processor 110 through the external memory interface 120, to implement a data storage function. For example, files such as music and a video are stored in the external storage card.

The internal memory 121 may be configured to store computer executable program code, where the executable program code includes instructions. The processor 110 runs the instructions stored in the internal memory 121, to perform various function applications and data processing of the tablet computer. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the tablet computer. In addition, the internal memory 121 may include a high-speed random access memory, or may include a non-volatile memory, such as at least one magnetic disk storage device, a flash memory, or a universal flash storage (universal flash storage, UFS).

The tablet computer may implement an audio function by using the audio module 170, the speaker 170A, the receiver 170B, the microphone 170C, the headset port 170D, the application processor, and the like. For example, a music playback function and a recording function are implemented.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. When a touch operation is performed on the display 194, the tablet computer detects the touch operation intensity by using the pressure sensor 180A. The tablet computer may also calculate a touch position based on a detection signal of the pressure sensor 180A.

The gyroscope sensor 180B may be configured to determine a motion posture of the tablet computer. The barometric pressure sensor 180C is configured to measure barometric pressure. The magnetic sensor 180D includes a Hall sensor. The tablet computer may detect opening and closing of a flip leather case by using the magnetic sensor 180D. The acceleration sensor 180E may detect magnitudes of accelerations in various directions (generally on three axes) of the tablet computer. The distance sensor 180F is configured to measure a distance. The tablet computer may detect, by using the optical proximity sensor 180G, that a user holds the tablet computer close to an ear to make a call, to automatically turn off a screen for power saving. The optical proximity sensor 180G can also be used in a leather case mode or a pocket mode to automatically unlock or lock the screen. The ambient light sensor 180L is configured to sense ambient light brightness. The fingerprint sensor 180H is configured to collect a fingerprint. The tablet computer may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a "touch panel". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor, to determine a type of a touch event. A visual output related to the touch operation may be provided by using the display 194. In some other embodiments, the touch sensor 180K may be alternatively disposed on a surface of the tablet computer, and is located on a position different from that of the display 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to provide an incoming call vibration prompt or a touch vibration feedback. The indicator 192 may be an indicator light, and may be configured to indicate a charging status and a power change, or may be configured to indicate a message, a missed call, a notification, and the like.

When the tablet computer includes the SIM card interface 195, the SIM card interface 195 is configured to connect to a SIM card. The SIM card may be inserted into the SIM card interface 195 or removed from the SIM card interface 195, to implement contact with and separation from the tablet computer. The tablet computer may support one or N SIM card interfaces, where N is a positive integer greater than 1. The tablet computer interacts with a network through a SIM card, to implement functions such as calling and data communication. In some embodiments, the tablet computer uses an eSIM, that is, an embedded SIM card. The eSIM card may be embedded in the tablet computer, and cannot be separated from the tablet computer.

Figure 4:
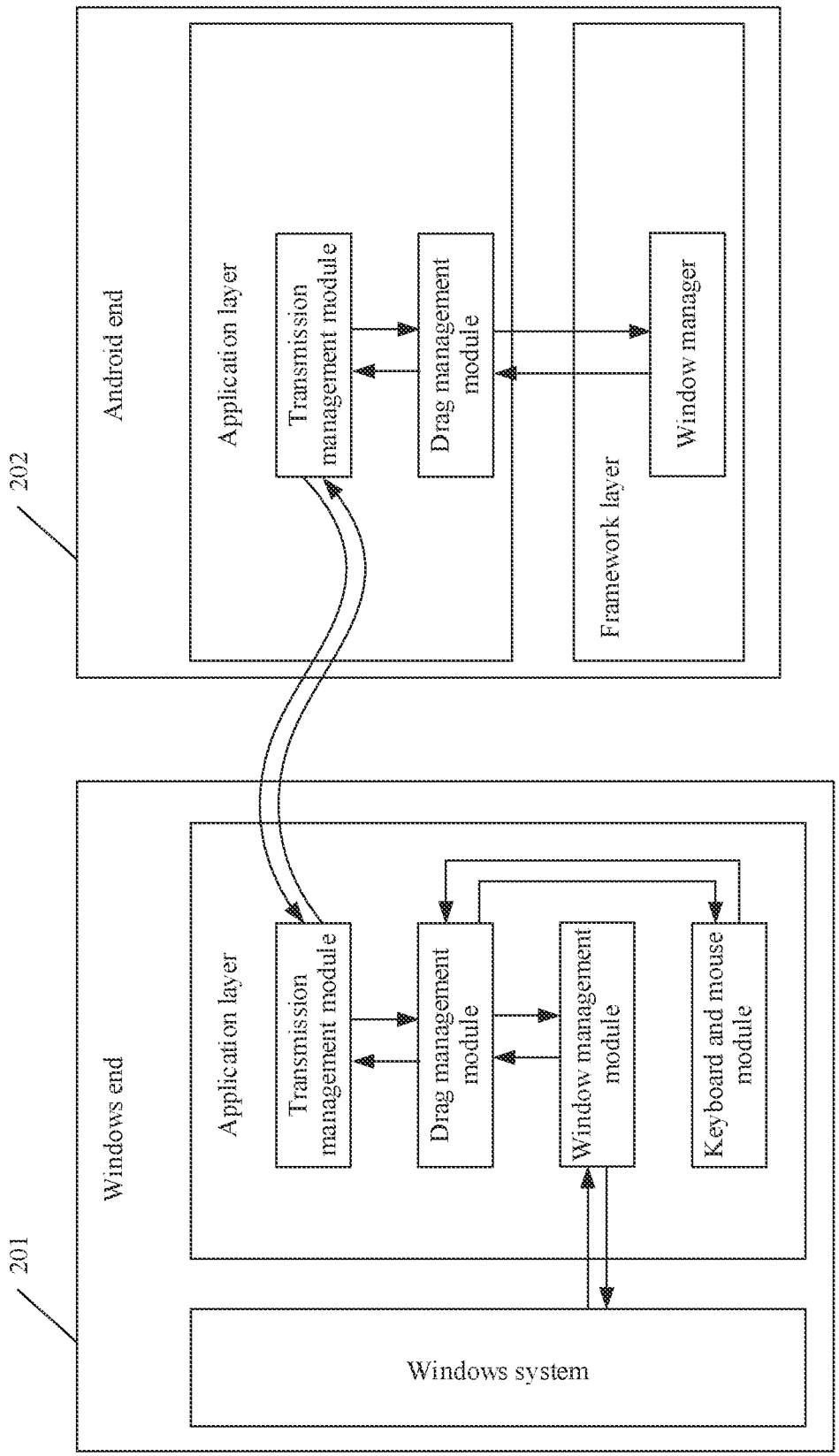
FIG. 4 is a schematic diagram of composition of a software architecture according to an embodiment of this application.

With reference to FIG. 2, in this embodiment of this application, an example in which a software system of the first terminal 201 is a Windows system and a software system of the second terminal 202 is an Android system is used to describe software structures of the first terminal 201 and the second terminal 202. FIG. 4 is a schematic diagram of composition of a software architecture according to an embodiment of this application.

As shown in FIG. 4, a software architecture of the first terminal 201 may include an application layer and a Windows system (Windows shell). In some embodiments, the application layer may include applications installed on the first terminal 201. The applications at the application layer can directly interact with the Windows system. For example, the application layer may further include a keyboard and mouse module, a transmission management module, a drag management module, and a window management module.

A software system of the second terminal 202 may use a layered architecture, an event-driven architecture, a microkernel architecture, a microservice architecture, or a cloud architecture. For example, the software system of the second terminal 202 is a layered architecture. In the layered architecture, software is divided into several layers, and each layer has a clear role and a clear task. The layers communicate with each other through a software interface. In some embodiments, as shown in FIG. 4, the second terminal 202 may include an application layer and a framework (framework, FWK) layer. The application layer may include a series of application packages. For example, the application package may include applications such as Settings, Calculator, Camera, SMS Messages, and Music Player. Applications included in the application layer may be system applications of the second terminal 202, or may be third-party applications. This is not specifically limited in this embodiment of this application. The application layer may further include a transmission management module and a drag management module. The framework layer mainly provides an application programming interface (application programming interface, API) and a programming framework for an application at the application layer. In this embodiment, the framework layer may include a window manager (or referred to as a window management service). Certainly, the second terminal 202 may further include another layer, for example, a kernel layer (not shown in FIG. 4). The kernel layer is a layer between hardware and software. The kernel layer may include at least a display driver, a camera driver, an audio driver, a sensor driver, and the like.

In this embodiment of this application, after the first terminal 201 establishes a connection to the second terminal 202, on a premise that projection is not started, based on the foregoing software architecture and when a keyboard and mouse sharing technology is used, a user may transfer content of the first terminal 201, such as a file or a text, to the second terminal 202 in a drag manner by using the input device 201-1 of the first terminal 201. Content of the second terminal 202, such as a file or a text, may be further transferred to the first terminal 201 in a drag manner. In other words, on a premise that projection is not started, the user may implement a bidirectional drag of content of an application, such as a file or a text, between the first terminal 201 and the second terminal 202 in a drag manner by using the input device 201-1 of the first terminal 201. The keyboard and mouse sharing technology may be a technology in which an input device (for example, a mouse or a touchpad) of a terminal is used to control another terminal.

It should be noted that, in this embodiment, the foregoing drag management module may alternatively be referred to as a drag service module. In addition, in the foregoing embodiment, it may be learned that both the first terminal 201 and the second terminal 202 include a transmission management module. Communication between the first terminal 201 and the second terminal 202 may be implemented by using the transmission management module. In some other embodiments, the drag management module may also have a function of communicating with another terminal. To be specific, the first terminal 201 and the second terminal 202 each may include no transmission management module, and communication between the first terminal 201 and the second terminal 202 may be implemented by using the drag management module. This is not specifically limited herein in this embodiment. For ease of description, in the following embodiment, an example in which communication between the first terminal 201 and the second terminal 202 is implemented by using the transmission management module is used for description.

With reference to FIG. 2 and FIG. 4, the following describes in detail the cross-device object drag method provided in embodiments of this application with reference to the accompanying drawings by using an example in which the first terminal 201 is a PC, the second terminal 202 is a tablet computer, and the input device 202-1 is a mouse.

Figure 5:
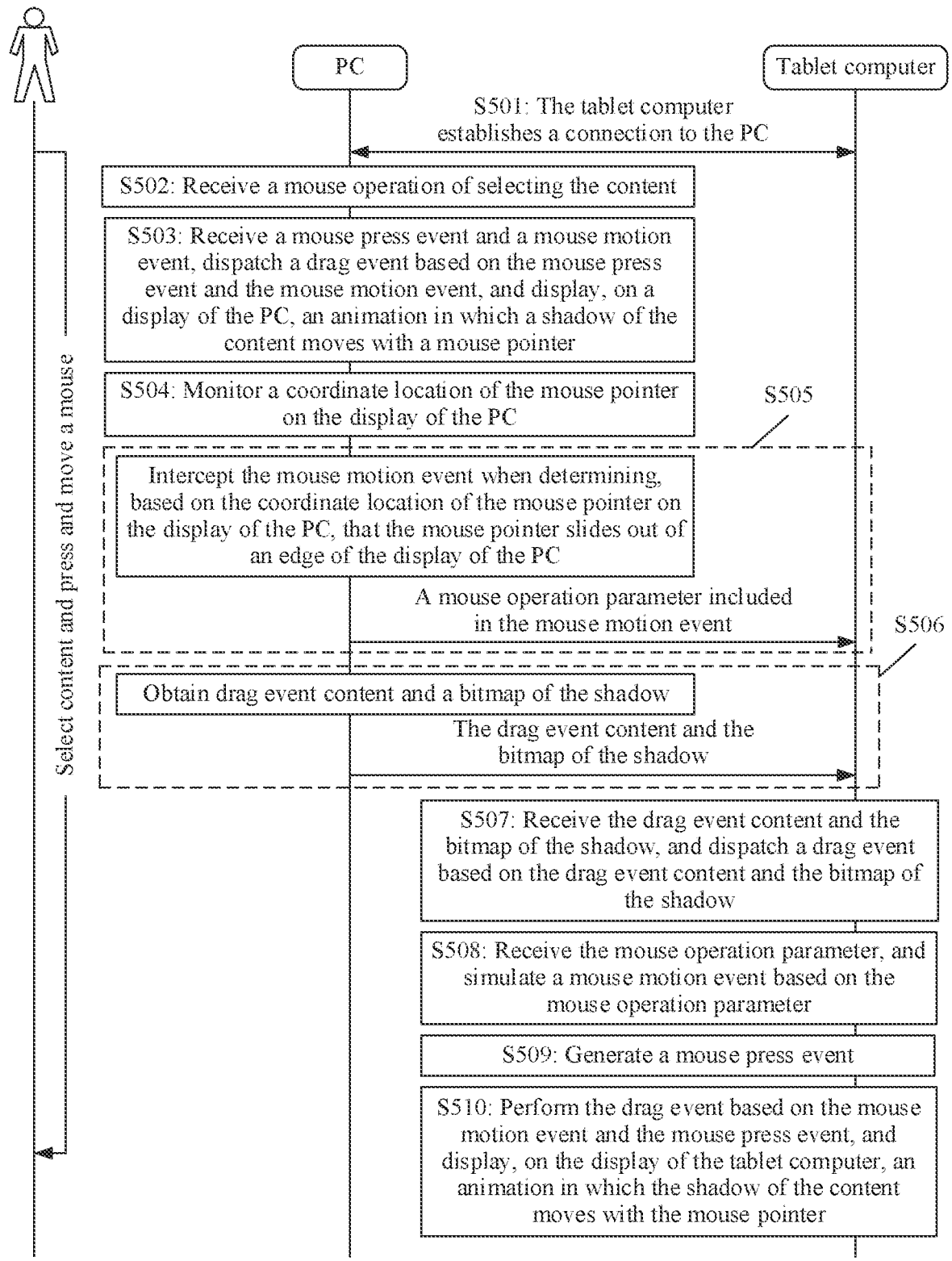
FIG. 5 is a schematic flowchart of a cross-device object drag method according to an embodiment of this application.

FIG. 5 is a schematic flowchart of a cross-device object drag method according to an embodiment of this application. In this embodiment, the method provided in this embodiment is described in detail by using an example in which a user uses a mouse of a PC to transfer content (the content is a to-be-dragged object) in the PC to a tablet computer in a drag manner. As shown in FIG. 5, the method may include the following S501 to S510.

S501: A tablet computer establishes a connection to a PC.

In some embodiments, the tablet computer may establish a connection to the PC in a wired manner. For example, the tablet computer may establish a wired connection to the PC through a data cable.

In some other embodiments, the tablet computer may establish a connection to the PC in a wireless manner. There are two requirements for establishing a connection between terminals in a wireless manner. One is that the terminals need to know connection information of each other, and the other is that each terminal needs to have a transmission capability. The connection information may be a device identifier of the terminal, for example, an internet protocol (internet protocol, IP) address, a port number, or a logged-in account on the terminal. The logged-in account on the terminal may be an account provided by an operator for a user, for example, a Huawei account. Alternatively, the logged-in account on the terminal may be an application account, for example, a WeChat account or a Youku account. The transmission capability that the terminal has may be a near-field communication capability, or may be a long-distance communication capability. To be specific, a wireless communication protocol used to establish a connection between terminals, for example, between the tablet computer and the PC, may be a near-field communication protocol such as a Wi-Fi protocol, a Bluetooth protocol, or an NFC protocol, or may be a cellular network protocol. For example, the tablet computer establishes a connection to the PC in a wireless manner. For example, the user may use the tablet computer to touch an NFC label of the PC, and the tablet computer reads connection information stored in the NFC label. For example, the connection information includes an IP address of the PC. Then, the tablet computer may establish a connection to the PC based on the IP address of the PC by using the NFC protocol. For another example, Bluetooth functions and Wi-Fi functions are enabled on both the tablet computer and the PC. The PC may broadcast a Bluetooth signal, to discover a surrounding terminal. For example, the PC may display a list of discovered devices, where the list of discovered devices may include an identifier of the tablet computer discovered by the PC. In addition, the PC may exchange connection information, for example, an IP address, with a discovered device in a process in which the PC performs device discovery. Then, after the PC receives an operation of selecting, by the user, the identifier of the tablet computer from the displayed list of devices, the PC may establish a connection to the tablet computer based on the IP address of the tablet computer by using the Wi-Fi protocol. For another example, both the tablet computer and the PC are connected to a cellular network, and a same Huawei account is logged in to on the mobile phone and the television. The tablet computer and the PC may establish a connection based on the Huawei account and a cellular network.

After the tablet computer is successfully connected to the PC, the tablet computer and the PC may be collaboratively used. To improve collaborative use efficiency, the user may use one input device, for example, a mouse of the PC, to control both the PC and the tablet computer.

In an example implementation, when a keyboard and mouse sharing mode of the PC is enabled, one input device may be used to control both the PC and the tablet computer.

For example, in some embodiments, after another terminal successfully establishes a connection to the PC, the PC may display a pop-up window, where the pop-up window is used to ask the user whether to enable the keyboard and mouse sharing mode. If an operation of selecting, by the user, to enable the keyboard and mouse sharing mode is received, the PC may enable the keyboard and mouse sharing mode.

After enabling the keyboard and mouse sharing mode, the PC may notify all terminals connected to the PC that the keyboard and mouse sharing mode is enabled. For example, the PC establishes a connection to the tablet computer. In this case, the PC notifies the tablet computer that the keyboard and mouse sharing mode is enabled (for example, the PC may send a notification message to the tablet computer, where the notification message may be used to indicate that the keyboard and mouse sharing mode of the PC is enabled). After receiving the notification, the tablet computer may create a virtual input device. The virtual input device has a same function as that of a conventional input device such as a mouse or a touchpad, and may be used by the tablet computer to simulate a corresponding input event. For example, the input device is a mouse. The virtual input device created by the tablet computer has a same function as that of a conventional mouse, and may be considered as a mouse shared by the PC to the tablet computer. The virtual input device can be used to simulate a mouse event on a tablet computer end, so that the mouse of the PC controls the tablet computer. For example, an operating system of the tablet computer is an Android system. The tablet computer may create the virtual input device by using an uinput capability of Linux, where uinput is a kernel layer module that can simulate an input device. By writing /dev/uinput (or /dev/input/uinput) to a device, a process may create a virtual input device with a specific function. Once the virtual input device is created, the virtual input device may simulate a corresponding event. Similarly, another terminal that establishes a connection to the PC also creates a virtual input device based on the received notification. It should be noted that, if an operating system of the terminal that receives the notification is an Android system, the virtual input device may be created by using the uinput capability of linux; or the virtual input device may be created by using a human interface device (human interface device, HID) protocol. If an operating system of the terminal that receives the notification is another operating system such as an IOS system or a Windows system, the virtual input device may be created by using a HID protocol. In addition, the foregoing embodiment is described by using an example in which the terminal connected to the PC creates the virtual input device after receiving the notification that is used to notify the PC that the keyboard and mouse sharing mode is enabled. In some other embodiments, after receiving the foregoing notification, the terminal connected to the PC may also display a pop-up window, to ask the user whether the user wants to use the input device of the PC to control the device. If an operation of selecting, by the user, to use the input device of the PC to control the device is received, the virtual input device is created; or if no operation of selecting, by the user, to use the input device of the PC to control the device is received, the virtual input device is not created.

For another example, in some other embodiments, after another terminal, for example, the tablet computer, establishes a connection to the PC, the PC may automatically enable the keyboard and mouse sharing mode by default. The user does not need to manually enable the keyboard and mouse sharing mode. After the another terminal, for example, the tablet computer, establishes a connection to the PC, the virtual input device may also be automatically created, and the PC does not need to send a notification. Alternatively, after the another terminal establishes a connection to the PC, a pop-up window may be first displayed, to ask the user whether the user wants to use the input device of the PC to control the device. If an operation of selecting, by the user, to use the input device of the PC to control the device is received, the virtual input device is automatically created; or if no operation of selecting, by the user, to use the input device of the PC to control the device is received, the virtual input device is not created.

In addition, with reference to FIG. 2, the mouse is the input device of the PC. Therefore, after the another terminal, for example, the tablet computer, establishes a connection to the PC, generally, the PC temporarily responds to an operation of the mouse; or in other words, the user may temporarily control the PC by using the mouse. In this embodiment, after enabling the keyboard and mouse sharing mode, the PC may further trigger, when determining that a mouse shuttle condition is met, the another terminal, that establishes a connection to the PC and that creates the virtual input device, for example, the tablet computer, to respond to the operation of the mouse. In other words, after the mouse shuttle condition is met, the user may use the mouse to control the another terminal, that establishes a connection to the PC and that creates the virtual input device, for example, the tablet computer.

For example, the mouse shuttle condition may be that a mouse pointer that corresponds to the mouse and that is displayed on a display of the PC slides over an edge of the display of the PC. To be specific, the user may move the mouse, so that the mouse pointer that corresponds to the mouse and that is displayed on the display of the PC slides over the edge of the display of the PC, to trigger the another terminal, that establishes a connection to the PC and that creates the virtual input device, to respond to the operation of the mouse.

In an example implementation, after enabling the keyboard and mouse sharing mode, the PC may enable input (input) listening, and mount a hook (HOOK). Input listening may be used to listen to relative displacement and a coordinate location of the mouse pointer. After a mouse shuttle starts, the mounted HOOK may be used to intercept a corresponding input event (or block a corresponding input event). For example, the input device is the mouse. In this case, the input event may be a mouse event. In this way, the mouse event is not transmitted to a Windows system of the PC after being received by a keyboard and mouse module of the PC. After the mouse shuttle starts, the mounted HOOK can also be used to capture a parameter in the intercepted input event, for example, the mouse event. The PC may listen to the relative displacement and the coordinate location of the mouse pointer by using the input listening, and determine, based on the monitored data, whether the mouse shuttle condition is met. After it is determined that the mouse shuttle condition is met, the mounted HOOK intercepts the mouse event, captures an operation parameter in the mouse event, and sends the captured operation parameter to the another terminal that establishes a connection to the PC and that creates the virtual input device, so that the terminal simulates a corresponding input event, for example, the mouse event, by using the created virtual input device, to respond to the corresponding input event. In other words, the another terminal that establishes a connection to the PC and that creates the virtual input device is enabled to respond to the operation of the mouse.

Certainly, another manner (for example, registering RAWINPUT on the PC) may alternatively be used to intercept an input event and capture an operation parameter in the input event. Alternatively, different manners may be separately used to intercept an input event and capture an operation parameter in the input event. For example, the input device is the mouse. After enabling the keyboard and mouse sharing mode, the PC may mount a HOOK and register RAWINPUT. After the mouse shuttle starts, the mounted HOOK may be used to intercept a mouse event (or block a mouse event), and the registered RAWINPUT may be used to capture an operation parameter in the intercepted mouse event. A specific implementation for intercepting the mouse event and capturing the operation parameter in the mouse event is not limited herein in this embodiment. For ease of description, the following embodiment provides descriptions by using an example in which a mounted HOOK is used to intercept an input event and capture an operation parameter in the input event.

For example, a user wants to transfer content of a PC to a tablet computer in a drag manner, and continues to drag the content in the tablet computer. In this case, a process of triggering another terminal, that establishes a connection to the PC and that creates a virtual input device, for example, the tablet computer, to respond to an operation of a mouse may include the following S502 to S506.

S502: The PC receives a mouse operation of selecting the content.

The foregoing content may be a text (text), or may be a file, or may be a folder. The file may include files in one or more of the following formats, for example, a Word document, an Excel workbook, a PowerPoint presentation, a bitmap, an image file, a plain text file, a sound file, a film file, a flash animation file, a web page file, and a compressed file.

In addition, in this embodiment, one or more pieces of content may be selected. For example, two Word documents are selected. For another example, a Word document and an image file are selected. For still another example, two folders are selected.

S503: The PC receives a mouse press event and a mouse motion event, dispatches a drag event based on the mouse press event and the mouse motion event, and displays, on a display of the PC, an animation in which a shadow of the content moves with a mouse pointer.

It should be noted that the mouse pointer in this embodiment may alternatively be referred to as a cursor. The cursor may be an image, and may be dynamic or static. A style of the cursor may be different in different cases. In this embodiment, the mouse pointer is used as an example for description.

The mouse pointer of the PC may be a first cursor in this application.

S504: The PC monitors a coordinate location of the mouse pointer on the display of the PC.

S505: When determining, based on the coordinate location of the mouse pointer on the display of the PC, that the mouse pointer slides out of an edge of the display of the PC, the PC intercepts the mouse motion event, and sends a mouse operation parameter included in the mouse motion event to the tablet computer.

S506: The PC obtains drag event content and a bitmap of the shadow, and sends the drag event content and the bitmap of the shadow to the tablet computer.

The drag event content is used by a drag continuation end device, for example, the tablet computer, to dispatch the drag event. For example, when the content in S502 is the text, the drag event content may include the text (text). For another example, when the content in S502 is the file or the folder, the drag event content may include a file path (for example, a uniform resource identifier (uniform resource identifier, URI)). The drag data in this application may include the drag event content and the bitmap of the shadow, and may be used by the continuation end device, for example, the tablet computer, to display, on a display of the drag continuation end device, an animation in which an object moves with the mouse pointer.

In this embodiment, after the keyboard and mouse sharing mode is enabled, when the user wants to transfer, in a drag manner, content of the PC to the another terminal, that establishes a connection to the PC and that creates the virtual input device, for example, the tablet computer, and continue to drag the content on the tablet computer, the user may use an input device of the PC to select the content that the user wants to drag. Subsequently, when the mouse pointer of the PC is displayed on the content, the user may input a drag operation, so that the PC may drag a corresponding object, that is, the content (for example, the content selected in S502), based on the drag operation.

The drag operation may be an operation used to indicate to dispatch the drag event for the selected content. The drag operation may include one operation, or may include a plurality of operations. For example, the drag operation includes two operations: a press operation and a motion operation. For example, the input device is the mouse. The press operation may be a mouse press operation, and the motion operation may be a mouse motion operation. The user may press and move the mouse (that is, use the mouse of the PC to input the mouse press operation and the mouse motion operation), to trigger a Windows system of the PC to dispatch the drag event for the content, so that the content (for example, the shadow of the content) can move, on the display of the PC, as the mouse pointer of the PC moves. The shadow may alternatively be referred to as a drag shadow.

In a process in which the content (for example, the shadow of the content) moves with the mouse pointer, the PC may determine whether the dragged content (for example, the shadow of the content) is dragged out from the edge of the display of the PC. A mouse shuttle condition may be triggered when the content (for example, the shadow of the content) is dragged out from the edge of the display of the PC. In this embodiment, that the content is dragged out from the edge of the display of the PC may be that a partial area of the content (for example, the shadow of the content) is dragged out from (or overflows) the display of the PC (that is, a ratio in which the area of the window that overflows the display is greater than a preset threshold), or may be that an entire area of the content (for example, the shadow of the content) is dragged out from (or overflows) the display of the PC, or may be that the mouse pointer slides out of the edge of the display of the PC when the content (for example, the shadow of the content) moves with the mouse pointer on the display of the PC. This is not specifically limited herein in this embodiment. The following provides descriptions by using an example in which determining whether the dragged content (for example, the shadow of the content) is dragged out from the edge of the display of the PC is specifically determining whether the mouse pointer slides out of the edge of the display of the PC.

In an example, the user may continuously move the mouse in a same direction to enable the mouse pointer correspondingly displayed on the display of the PC to slide over (or slide out) the edge of the display of the PC, that is, to trigger the mouse shuttle condition.

For example, the PC may determine the coordinate location of the mouse pointer on the display of the PC based on an initial location and relative displacement of the mouse pointer, to determine whether the mouse pointer slides out of the edge of the display of the PC.

Figure 6A:
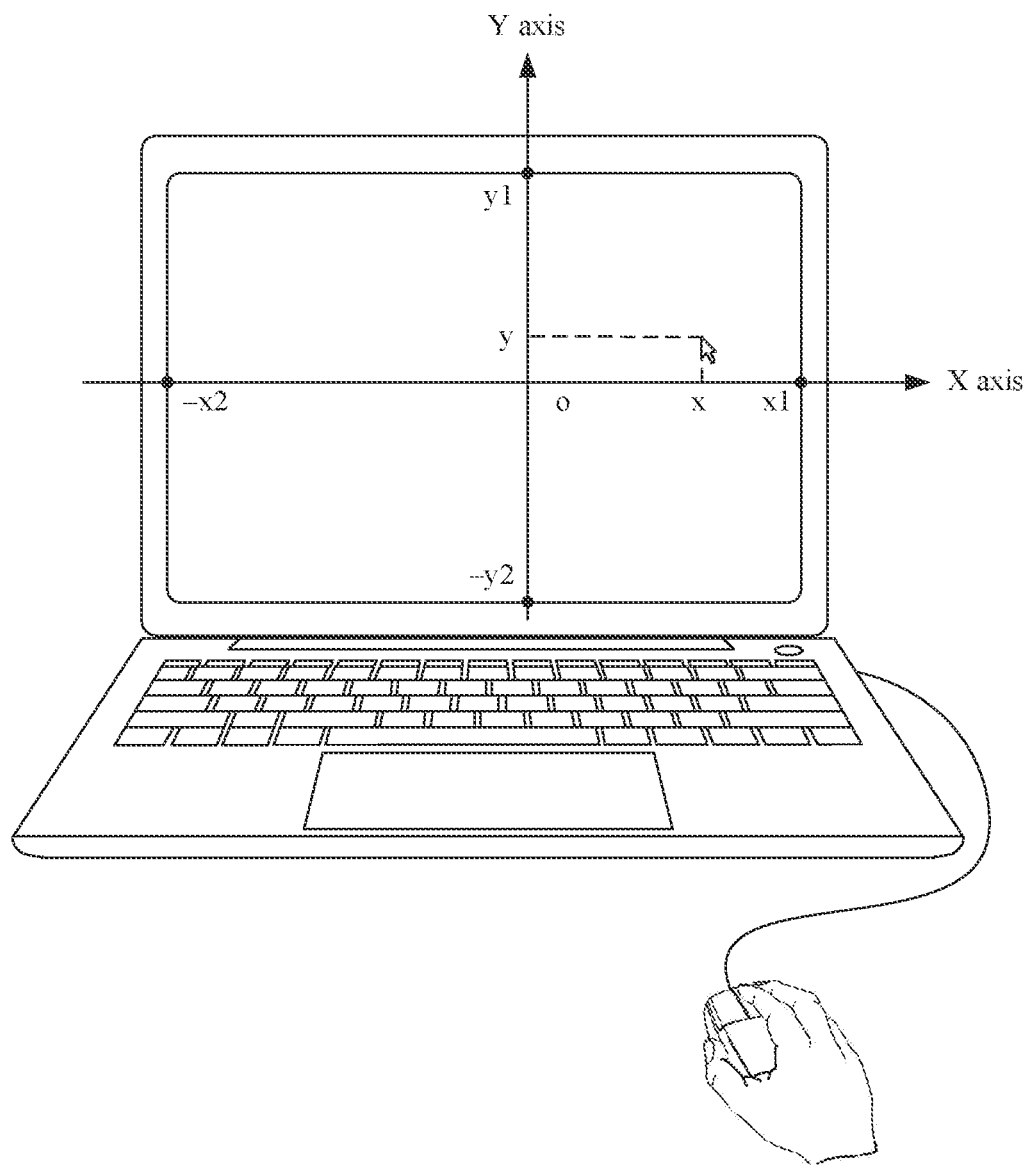
FIG. 6A is a schematic diagram of a coordinate system on a display according to an embodiment of this application.

The initial location of the mouse pointer may be a coordinate location of the mouse pointer on the display of the PC when the mouse starts to move, or in other words, a coordinate location of the mouse pointer on the display of the PC before the mouse starts to move. The initial location of the mouse pointer may specifically be a coordinate location in a coordinate system in which an upper left corner of the display of the PC is used as a coordinate origin, an X axis points from the upper left corner to a right edge of the display of the PC, and a Y axis points from the upper left corner to a lower edge of the display of the PC. For example, a specific process in which the PC determines whether the mouse pointer slides out of the edge of the display of the PC may be as follows: With reference to FIG. 6A, the PC may establish a coordinate system in which the initial coordinate location is used as a coordinate origin (a location o shown in FIG. 6A), an X axis points from the coordinate origin o to a right edge of the display of the PC, and a Y axis points from the coordinate origin o to an upper edge of the display of the PC. The PC may determine a coordinate value of each edge of the display of the PC in the coordinate system. The coordinate value of each edge of the display of the PC in the coordinate system may be determined based on resolution of the display of the PC and the initial location of the mouse pointer. For example, as shown in FIG. 6A, in the coordinate system, a coordinate value of the right edge of the display of the PC on the X axis is x1, a coordinate value of a left edge of the display of the PC on the X axis is −x2, a coordinate value of the upper edge of the display of the PC on the Y axis is y1, and a coordinate value of a lower edge of the display of the PC on the Y axis is −y2. After the mouse moves, the mouse reports the relative displacement corresponding to the mouse pointer to the PC. The PC may calculate, based on the relative displacement reported by the mouse, a coordinate location (x, y) of the mouse pointer on the display of the PC after the mouse moves. The PC may determine, based on the coordinate location (x, y), whether the mouse pointer slides out of the edge of the display of the PC. For example, if a coordinate value x of the mouse pointer on the X axis is greater than x1, it may be determined that the mouse pointer slides out of the right edge of the display of the PC. If a coordinate value x of the mouse pointer on the X axis is less than −x2, it may be determined that the mouse pointer slides out of the left edge of the display of the PC. If a coordinate value y of the mouse pointer on the Y axis is greater than y1, it may be determined that the mouse pointer slides out of the upper edge of the display of the PC. If a coordinate value y of the mouse pointer on the Y axis is less than −y2, it may be determined that the mouse pointer slides out of the lower edge of the display of the PC.

After it is determined that the mouse pointer slides out of the edge of the display of the PC, that is, the mouse shuttle condition is triggered, the user may use the input device of the PC to control the another terminal that establishes a connection to the PC and that creates the virtual input device. In other words, after the mouse shuttle condition is triggered, the PC may send, to the another terminal that creates the virtual input device, data of an operation that is input by the user by using the input device of the PC. For example, if the user still continues to move the mouse in the same direction, the PC may intercept a received motion event, for example, the mouse motion event, and transmit an operation parameter, for example, the mouse operation parameter, that is included in the mouse motion event to the another terminal that establishes a connection to the PC and that creates the virtual input device, so that the terminal continues the drag event.

It should be noted that, in this embodiment, if there is only one device connected to the PC, for example, the tablet computer, and the tablet computer creates the virtual input device, the PC may transmit a corresponding operation parameter to the tablet computer, so that the tablet computer continues the drag event.

If there are a plurality of devices that are connected to the PC, and some or all of the plurality of devices create virtual input devices, in some embodiments, the PC may display a list option on the display of the PC when determining that the mouse shuttle condition is triggered. The list option includes an identifier of the device that creates the virtual input device in the devices that are connected to the PC (for example, includes an identifier of the tablet computer). The PC may determine, based on a selection of the user, a device for implementing drag event continuation. If the user selects the identifier of the tablet computer, the PC may send the corresponding operation parameter to the tablet computer, so that the tablet computer continues the drag event. After completing creation of the virtual input device, the device connected to the PC may send, to the PC, an indication message indicating that the virtual input device is successfully created. The PC may obtain, based on the received indication message, devices that are in the devices connected to the PC and that successfully create the virtual input devices, and display the list option based on the received indication message. In some other embodiments, a shuttle relationship may be pre-configured. If there are a plurality of devices connected to the PC, and some or all of the plurality of devices establish virtual input devices, the device for implementing drag continuation may be determined according to the pre-configured shuttle relationship. For example, if the plurality of devices connected to the PC include the tablet computer, the tablet computer creates the virtual input device, and the pre-configured shuttle relationship is that the mouse pointer slides out from a left side (or the left edge) of the display of the PC, it is determined that the device for implementing drag continuation is the tablet computer. In this case, when the user presses and moves the mouse, so that the mouse pointer slides over the left edge of the display of the PC, the PC may determine that the mouse shuttle starts, and may further determine that the device for implementing drag continuation is the tablet computer. Certainly, when there is only one device connected to the PC, and the device creates a virtual input device, the pre-configured shuttle relationship may also be used to determine whether the device for implementing drag continuation is the device. For example, the pre-configured shuttle relationship is that the mouse pointer slides out from the left edge of the display of the PC. In this case, the mouse shuttles to the tablet computer. However, after the user presses and moves the mouse, so that the mouse pointer slides over the right edge of the display of the PC, it may be determined that the mouse does not shuttle to the tablet computer. In some other embodiments, the device for implementing drag continuation may be determined by identifying a location of a device. For example, the user presses and moves the mouse, so that the mouse pointer slides over the left edge of the display of the PC. In this case, positioning technologies such as Bluetooth, ultra-wideband (Ultra-wideband, UWB), and an ultrasonic wave may be used to identify a location of a device located around the PC. For example, if the PC identifies that the tablet computer is on the left side of the PC, it may be determined that the device for implementing drag continuation is the tablet computer.

The shuttle relationship may be configured in advance by the user by using a configuration file, or a configuration interface for configuring the shuttle relationship may be provided for the user, and the user may configure the shuttle relationship in advance by using the configuration interface. For example, the user configures a shuttle relationship of the tablet computer by using an interface. The PC receives an operation of opening a configuration interface by the user, and displays the configuration interface. The configuration interface includes an identifier of the PC (for example, an icon of the PC) and the identifier of the tablet computer (for example, an icon of the tablet computer). The user may configure the shuttle relationship by dragging the two identifiers. In an example, if the user places the identifier of the tablet computer on a left side of the identifier of the PC, the PC may determine that when the mouse pointer slides over the left edge of the display of the PC, the device for implementing drag continuation is the tablet computer. If the user places the identifier of the tablet computer on a right side of the identifier of the PC, the PC may determine that when the mouse pointer slides over the right edge of the display of the PC, the device for implementing drag continuation is the tablet computer. When there are a plurality of devices, a shuttle relationship of each device may be configured in a pre-configuration manner. The following embodiments provide descriptions by using an example in which the determined device for implementing drag continuation is the tablet computer. It should be noted that, for the two implementations of determining, based on the pre-configured shuttle relationship and the identified device location, the device for implementing drag continuation, S501 may be performed before the mouse shuttle is triggered, or may be performed after the mouse shuttle is triggered. This is not specifically limited herein in this embodiment.

Figure 6B:
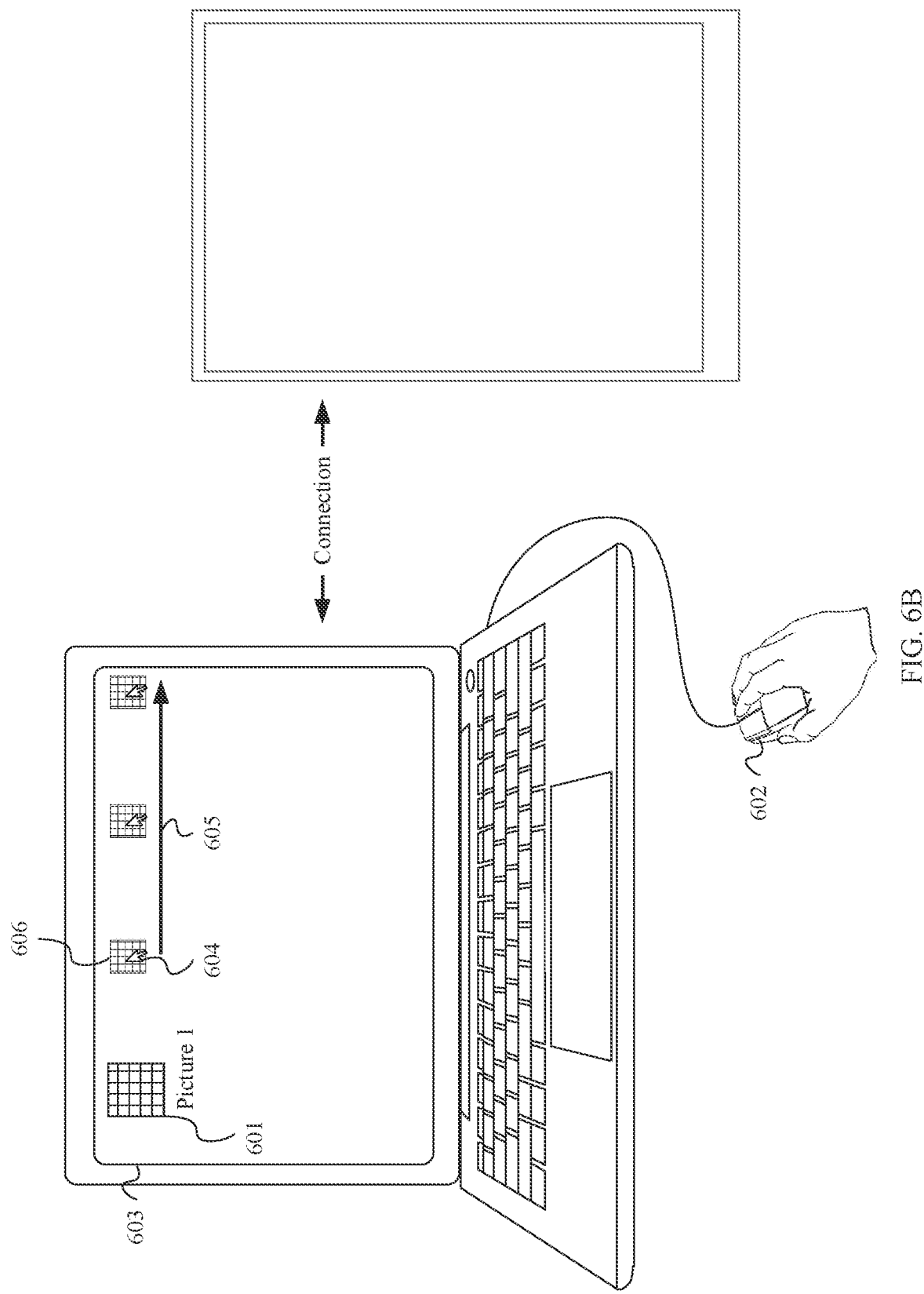
FIG. 6B is a schematic diagram of a cross-device object drag interface according to an embodiment of this application.

For example, with reference to FIG. 4, after the user selects, by using the mouse, the content that the user wants to drag, a keyboard and mouse module of the PC may receive a corresponding operation, for example, the mouse operation of selecting the content by the user. The user may move the mouse, so that the mouse pointer of the PC is displayed on the content selected by the user. Then, if the user presses and moves the mouse (that is, uses the mouse of the PC to input the press operation (for example, the mouse press operation) and the motion operation (for example, the mouse motion operation), the keyboard and mouse module of the PC may correspondingly receive the press event (for example, the mouse press event) and the motion event (for example, the mouse motion event). In this case, because the mouse shuttle condition is not triggered, a mounted hook does not intercept the input event, and the mouse press event and the mouse motion event are transmitted to the Windows system of the PC. Based on the received mouse press event and mouse motion event, the Windows system of the PC may dispatch the drag event for the content, and draw the content. For example, the animation (or referred to as a drag animation) in which the shadow of the content moves with the mouse pointer is displayed on the display of the PC. For example, as shown in FIG. 6B, the user wants to drag a picture 601 on the PC to the tablet computer, and continue to drag the picture 601 on the tablet computer. The user selects the picture 601 by using a mouse 602, and then presses and moves the mouse 602. As the mouse 602 moves, the PC correspondingly displays, on a display 603 of the PC, an animation in which a shadow 606 of the picture 601 moves with a mouse pointer 604. As shown in FIG. 6B, a drag track along which the shadow 606 of the picture 601 moves with the mouse pointer 604 is shown as a track 605. It should be noted that, in this embodiment, an operation of selecting the content, for example, the mouse operation of selecting the content in S502, is optional. For example, when the content that the user wants to drag is a file or a folder, the mouse operation of selecting the content may not be performed, but a press operation and a motion operation are performed when the mouse pointer is displayed on the file or the folder, so that a drag event for the file or the folder can be dispatched.

In addition, as described in S501, after the keyboard and mouse sharing mode is enabled, the PC enables input listening, and mounts the hook. After the drag event is dispatched, the mouse pointer moves on the display of the PC, and the keyboard and mouse module of the PC may monitor a real-time coordinate location of the mouse pointer on the display of the PC by using input listening. When the keyboard and mouse module of the PC determines, based on the monitored real-time coordinate location of the mouse pointer on the display of the PC, that the mouse pointer slides out of the edge of the display of the PC, it may be determined that the foregoing mouse shuttle condition is met. In this case, the keyboard and mouse module of the PC may determine that a mouse shuttle starts.

After the keyboard and mouse module of the PC determines that the mouse shuttle starts, the keyboard and mouse module of the PC may send, to the tablet computer by using a transmission management module of the PC and by using a connection established between the keyboard and mouse module and the tablet computer, shuttle status information used to indicate that the mouse shuttle starts. After receiving the information, the tablet computer may simulate a mouse pointer, and display the mouse pointer on the display of the tablet computer (where the mouse pointer displayed on the display of the tablet computer may be the second cursor in this application). The keyboard and mouse module of the PC may alternatively hide the mouse pointer displayed on the display of the PC. Certainly, the object that moves with the mouse pointer, for example, the shadow of the object, is also hidden. For example, with reference to FIG. 6B, as the mouse 602 moves, after the mouse pointer 604 slides over an edge of the display 603 of the PC, the PC hides the shadow 606 of the picture 601 displayed on the display 603 of the PC and the mouse pointer 604. In addition, the tablet computer displays the mouse pointer on the display of the tablet computer. This gives the user a visual effect that the mouse pointer shuttles from the PC to the tablet computer.

After the keyboard and mouse module of the PC determines that the mouse shuttle starts, if the user performs an operation on the mouse, the keyboard and mouse module of the PC may intercept, by using the hook, a received corresponding input event, for example, a mouse event, and capture an operation parameter, for example, a mouse operation parameter, in the intercepted mouse event. The mouse operation parameter may include a mouse button flag bit (which is used to indicate a specific operation that is of press, lift, motion, or scroll wheel scrolling and that is performed by the user on the mouse), coordinate information (which is used to indicate an X coordinate and a Y coordinate for which the mouse moves when the user moves the mouse), scroll wheel information (which is used to indicate an X-axis distance and a Y-axis distance at which a scroll wheel scrolls when the user operates the scroll wheel of the mouse), and button location information (which is used to indicate a specific button that is of a left button, a middle button, or a right button of the mouse and that is operated by the user). The keyboard and mouse module of the PC may further transmit the captured operation parameter, for example, the mouse operation parameter, to the tablet computer through the established connection by using the transmission management module of the PC. The captured operation parameter is used by the tablet computer to respond. For example, still with reference to the example shown in FIG. 6B, after the mouse pointer slides over the edge of the display of the PC, the user continues to move the mouse in the same direction. The keyboard and mouse module of the PC may receive a motion event, for example, a mouse motion event. In this case, the keyboard and mouse module of the PC may intercept (or block) the mouse motion event by using the hook, so that the mouse motion event is not sent to the Windows system of the PC. In this way, the PC does not respond to the received mouse motion event. The keyboard and mouse module of the PC may further capture an operation parameter of the intercepted mouse motion event, for example, a mouse operation parameter, by using the hook, and send the captured mouse operation parameter to the tablet computer through the established connection by using the transmission management module of the PC. In an example, when the mouse event is the mouse motion event, the corresponding mouse operation parameter may be a mouse button flag bit used to indicate that the user moves the mouse, coordinate information used to indicate an X coordinate and a Y coordinate for which the mouse moves, scroll wheel information (where a value is empty), and button location information (where a value is empty).

In addition, after the mouse shuttle starts, the PC (for example, a drag management module of the PC) may identify a current drag state (namely, whether the PC is performing drag) of the PC. If the PC is currently performing drag, the PC may dispatch continuation for the drag event, or dispatch cross-screen drag. For a Windows end, the drag event needs to be dispatched from a window and received by using a window. Therefore, after determining that the mouse shuttle starts, the PC may display a non-visible window, or referred to as an invisible window. For example, after the keyboard and mouse module of the PC determines that the mouse shuttle starts, the keyboard and mouse module of the PC may send, to the drag management module of the PC, a callback indication indicating that the mouse shuttle starts. The drag management module of the PC may send, to a window management module of the PC based on the callback indication, a request used to indicate to create the invisible window. The window management module of the PC may create, based on the request, and display the invisible window. For example, the window management module of the PC may display the invisible window on the edge of the display of the PC. Transparency of the invisible window is greater than a threshold. For example, the transparency of the invisible window is very high, or the invisible window is fully transparent.

After the invisible window is displayed, if the PC is performing drag when the mouse shuttle occurs, that is, when the mouse shuttle occurs, the Windows system of the PC dispatches the drag event for the content, the invisible window may receive the drag event from the Windows system. If the PC performs no drag w % ben the mouse shuttle occurs, that is, the user select no any content when moving the mouse, but only moves the mouse, the invisible window receives no drag event. After the invisible window receives the drag event, the window management module of the PC may obtain the drag event content from the drag event received by the invisible window. For example, the window management module of the PC may capture the drag event content from the drag event by using a DragEnter event. After obtaining the drag event content, the window management module of the PC may send the drag event content to the tablet computer through the established connection to the tablet computer by using the transmission management module of the PC. Before the drag event content is sent to the tablet computer, the PC may further perform serialization processing on the drag event content. To be specific, the drag event content sent by the PC to the tablet computer may be data obtained after serialization processing is performed.

Figure 7:
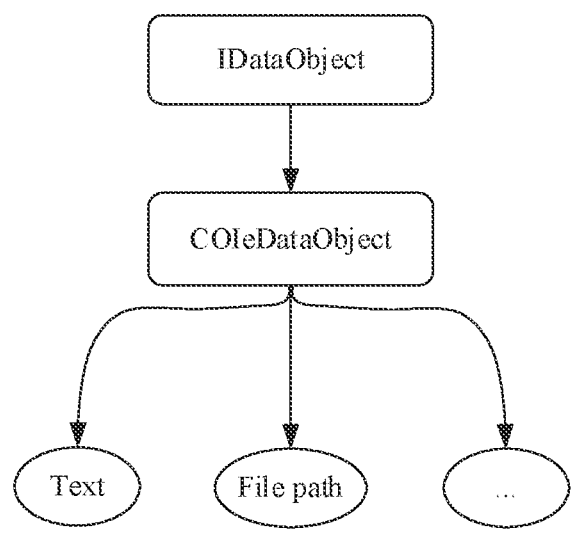
FIG. 7 is a schematic diagram of a data structure of a drag event at a Windows end according to an embodiment of this application.

For example, FIG. 7 is a schematic diagram of a data structure of a drag event at a Windows end according to an embodiment of this application. When the drag event enters an invisible window, the invisible window receives a data object, for example, IDataObject, that corresponds to the drag event. A window management module of the PC may attach (attach) the data object to COleDataObject. Then, the drag event content in IDataObject corresponding to the drag event is obtained by using a DragEnter event, for example, calling a GetData function. In this embodiment, the drag event content required for continuing the drag event may include a text, a file path, or the like. In an example, the window management module of the PC may obtain the text in IDataObject by using a GetData(CF_UNICODETEXT) function. The window management module of the PC may obtain the file path in IDataObject by using a GetData (CF_HDROP) function. After the text or the file path is obtained, serialization processing may be performed on the text or the file path, and then a processed text or file path is sent to the tablet computer.

In addition, in this embodiment, to display the dragged object at the tablet computer end, for example, the animation in which the shadow of the object moves with the mouse pointer, because the shadow and the bitmap (bitmap) may be mutually converted, the PC further needs to obtain the bitmap (bitmap) of the shadow displayed at the PC end. For example, the PC may obtain the bitmap of the shadow in a manner of capturing an image that is displayed on the display of the PC and that is of the dragged content. For another example, the dragged content is the text. The PC may generate the bitmap of the shadow based on the dragged text. For still another example, the dragged content is the file. The PC may find the dragged content based on the obtained file path of the dragged content, to determine a type (for example, an image file) of the dragged content, and then use a corresponding default material as the bitmap of the shadow based on the type, or may obtain a thumbnail of the content as the bitmap of the shadow based on the obtained file path of the dragged content. The bitmap of the shadow may be sent to the tablet computer through the established connection to the tablet computer by using the transmission management module of the PC. Before the bitmap of the shadow is sent to the tablet computer, the PC may further perform serialization processing on the bitmap of the shadow. To be specific, the bitmap of the shadow sent by the PC to the tablet computer may be data obtained after serialization processing is performed.

S507: The tablet computer receives the drag event content and the bitmap of the shadow, and dispatches a drag event based on the drag event content and the bitmap of the shadow.

S508: The tablet computer receives the mouse operation parameter, and simulates a mouse motion event based on the mouse operation parameter.

S509: The tablet computer generates a mouse press event.

After receiving the drag event content and the bitmap of the shadow, the tablet computer may parse the drag event content and the bitmap of the shadow, and dispatch the drag event. For an Android system, the drag event needs to be dispatched from a view control and received by using a view control. Therefore, the tablet computer may enable a transparent activity (activity), or referred to as an invisible activity. The invisible activity has a view control whose transparency is greater than a threshold. By using the view control and by invoking an Android open source project (Android open source project, AOSP) interface, the tablet computer may dispatch the corresponding drag event based on the received drag event content and bitmap of the shadow, to continue the drag event on the tablet computer.

For example, with reference to FIG. 4 and the example shown in FIG. 7, after receiving the drag event content and the bitmap of the shadow, a transmission management module of the tablet computer may transmit the drag event content and the bitmap of the shadow to a drag management module of the tablet computer. The drag management module of the tablet computer parses the received drag event content, to obtain the text or the file path from the PC. Based on the obtained text or file path, the drag management module of the PC may construct content data (clipData) of the drag event. In addition, the drag management module of the tablet computer may further generate a corresponding shadow based on the received bitmap of the shadow. Then, by using the view control of the transparent activity enabled by the tablet computer, the drag management module of the tablet computer may invoke a startDragAndDrop method provided by the AOSP interface, and use the clipData and the shadow as input parameters, so that the drag event at the tablet computer end can be dispatched. Certainly, if the PC further performs serialization processing before sending the drag event content and the bitmap of the shadow to the tablet computer, after receiving the corresponding data, the tablet computer performs deserialization processing to obtain the drag event content and the bitmap of the shadow.

Figure 8:
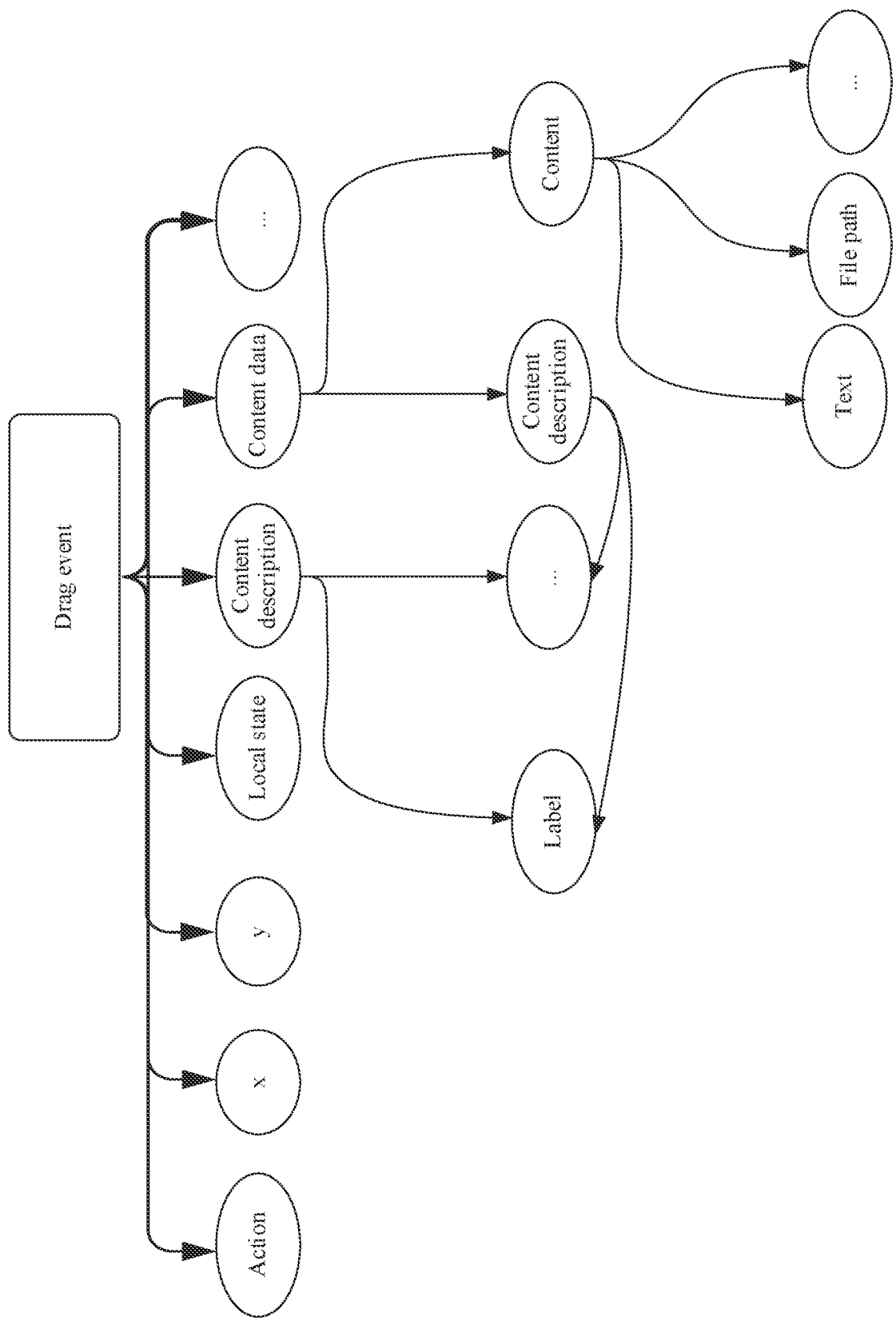
FIG. 8 is a schematic diagram of a data structure of a drag event at an Android end according to an embodiment of this application.

In an example, FIG. 8 is a schematic diagram of a data structure of a drag event (DragEvent) at an Android end according to an embodiment of this application. With reference to FIG. 8, the drag management module of the tablet computer may construct the content data (clipData) based on the text (text), the file path (URI), or the like that is received from the PC (where the text or the file path is included in an item (item) included in the content data), generate the corresponding shadow based on the received bitmap of the shadow, invoke the startDragAndDrop method of the AOSP, and use the clipData, the shadow, another parameter (for example, an action (action, which may include start, entering, hovering, release, leaving, end, and the like), a current x coordinate, a current y coordinate, a local state (localstate), a content description (clipdescription)) obtained based on information about the operation of the user for the mouse (for example, the received mouse motion event), and the like as an input parameter, to dispatch (dispatch) the drag event (DragEvent) at the tablet computer end.

It should be noted that, with reference to FIG. 8, the content description includes a label (label). The label is used to indicate whether the drag event is dispatched by the drag management module of the tablet computer or dispatched by an application on the tablet computer. For example, the label is a string (String). For example, when being "windowscast", the label is used to indicate that the drag event is dispatched by the drag management module of the tablet computer; or when being not "windowscast", the label is used to indicate that the drag event is not dispatched by the drag management module of the tablet computer, but dispatched by the application on the tablet computer. In the foregoing example, because the drag event is dispatched by the drag management module, the label in the content description of the drag event is "windowscast". Specific descriptions and a construction rule of the another parameter are similar to a corresponding implementation of generating an original drag event at the Android end in the conventional technology. Details are not described herein again.

It may be understood that execution of the drag event may be triggered by the drag operation, and the drag operation may include the press operation (for example, the mouse press operation) and the motion operation (for example, the mouse motion operation). However, when the user wants to transfer the content on the PC to the tablet computer in a drag manner, and continue to drag the content on the tablet computer, after the user moves the mouse to trigger a mouse shuttle, the user continues to move the mouse in the same direction. In other words, the user inputs the motion operation by using the input device of the PC, for example, inputs the mouse motion operation by using the mouse of the PC. In this case, as described in S505, after the user inputs the mouse motion operation by using the mouse of the PC, the keyboard and mouse module of the PC intercepts the corresponding received motion event, for example, the mouse motion event, captures and processes the operation parameter, for example, the mouse operation parameter, that is included in the mouse motion event, and then sends a processed mouse operation parameter to the tablet computer by using the transmission management module of the PC, for example, sends the processed mouse operation parameter to the transmission management module of the tablet computer. In this case, the transmission management module of the tablet computer may receive the mouse operation parameter. Because operating systems of the PC and the tablet computer are different, button values of mouse operation parameters in mouse events of the PC and the tablet computer are different. Therefore, after receiving the mouse operation parameter, the tablet computer may convert, based on a preset mapping relationship, button bit code of the received mouse operation parameter into button bit code that can be identified by the tablet computer. Then, the tablet computer (for example, a keyboard and mouse module of the tablet computer) may simulate, by using a created virtual input device and based on a mouse operation parameter obtained after the button bit code is converted, an input event that can be identified by the tablet computer, for example, the mouse event, to simulate a motion event, for example, the mouse motion event, that can be identified by the tablet computer. The keyboard and mouse module of the tablet computer may further send the mouse motion event to a framework layer of the tablet computer.

In addition, when the mouse shuttle starts, a shuttle initiator, namely, the PC, is in a state of being performing drag, that is, the PC is in a mouse press state, and a shuttle target end, namely, the tablet computer, may receive only the mouse motion event, that is, is not in the mouse press state. Therefore, the tablet computer may generate a press operation, for example, a mouse press operation. For example, after the tablet computer invokes the startDragAndDrop method provided by the AOSP interface, the tablet computer may receive a drag start callback (onDragStart). In this case, the tablet computer may determine, based on the label in the drag event dispatched by the tablet computer, whether the drag event is dispatched by the drag management module of the tablet computer. When it is determined that the drag event is dispatched by the drag management module of the tablet computer (for example, the label is "windowscast"), the tablet computer may generate (or simulate) a press event, for example, the mouse press event, based on an operation parameter of the press operation, for example, the mouse press operation and by using the created virtual input device. For example, the drag management module of the tablet computer controls the keyboard and mouse module of the tablet computer to send the mouse press event to the framework layer of the tablet computer by using the created virtual input device. Only in this way can the drag event dispatched in S507 at the tablet computer end be attached to the mouse pointer displayed on the display of the tablet computer.

S510: The tablet computer performs the drag event based on the mouse motion event and the mouse press event, and displays, on the display of the tablet computer, an animation in which the shadow of the content moves with the mouse pointer.

Figure 9:
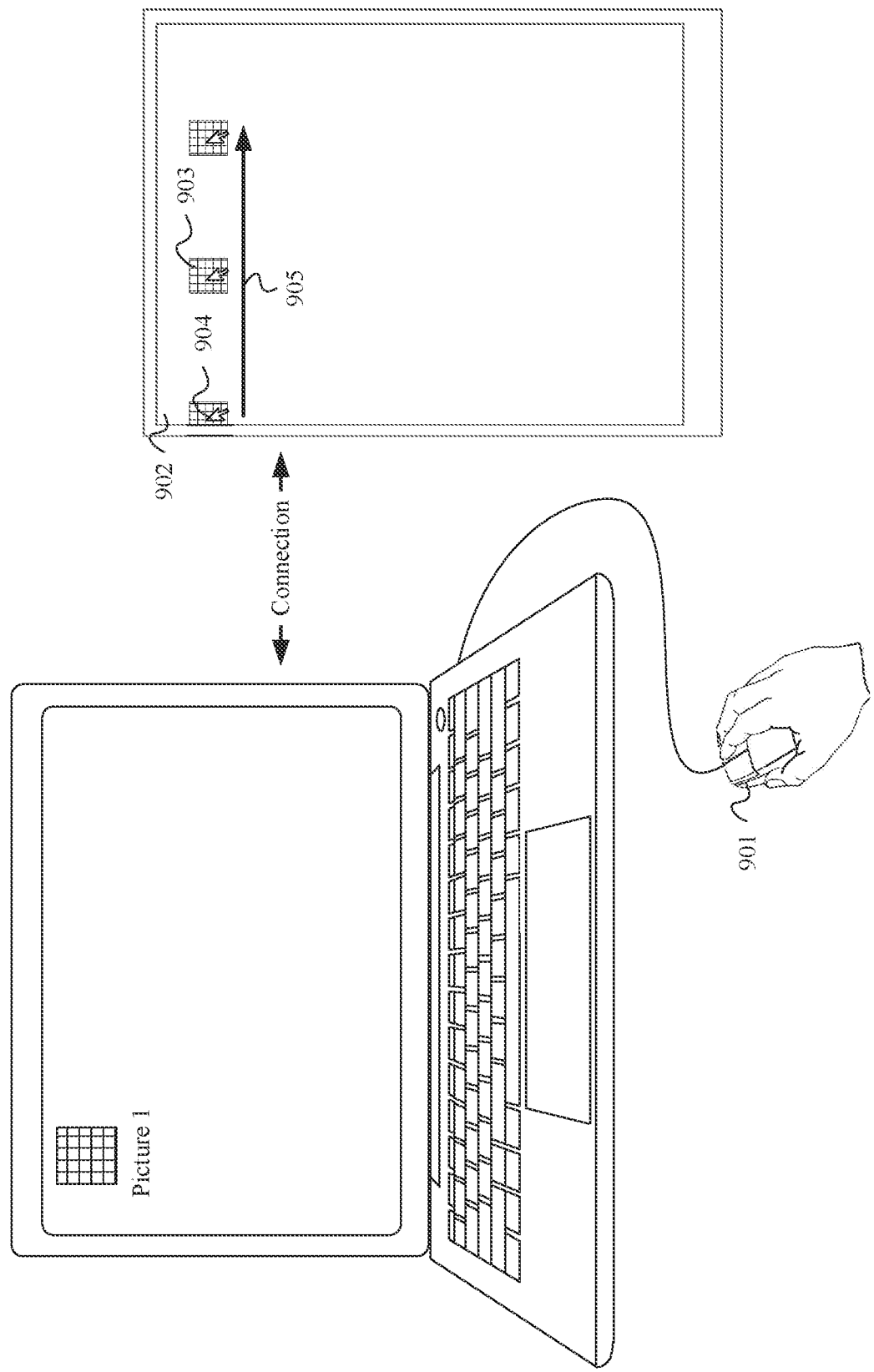
FIG. 9 is a schematic diagram of another cross-device object drag interface according to an embodiment of this application.

The tablet computer (for example, the framework layer of the tablet computer) may perform, based on the motion event, for example, the mouse motion event, and the press event, for example, the mouse press event, the drag event dispatched in S507. In a process of executing the drag event, the tablet computer may further display the content on the display of the tablet computer, for example, the animation in which the shadow of the content moves with the mouse pointer (where the mouse pointer may be the second cursor in this application). For example, with reference to FIG. 6B, as shown in FIG. 9, as the mouse 901 moves, the tablet computer correspondingly displays, on a display 902 of the tablet computer, an animation in which a shadow 903 of a picture moves with a mouse pointer 904. As shown in FIG. 9, a drag track along which the shadow 903 of the picture moves with the mouse pointer 904 is shown as a track 905.

After the user drags the content from the PC to the tablet computer in a drag manner, and continues to drag the content on the tablet computer, because at the tablet computer end, the drag event is attached to the mouse pointer displayed on the display of the tablet computer, the user may accurately select a mouse release point by using the mouse pointer. For example, if the user wants to use or process the content on the tablet computer, the user may release the mouse after moving the mouse pointer to a view control that is on the tablet computer and that is of the content that the user wants to use or process. After the mouse is released, the keyboard and mouse module of the PC may receive a corresponding lift event, for example, a mouse lift event. Because the mouse lift event is received by the PC after the mouse shuttle starts, the keyboard and mouse module of the PC intercepts (or blocks) the mouse lift event by using the hook, so that the mouse lift event is not sent to the Windows system of the PC. In this way, the PC does not respond to the received mouse lift event. The keyboard and mouse module of the PC may further capture an operation parameter included in the mouse lift event, for example, a mouse operation parameter, by using the HOOK, and send the captured mouse operation parameter to the tablet computer through the established connection by using the transmission management module of the PC. The mouse operation parameter of the mouse lift event may include a mouse button flag bit used to indicate that the user lifts the mouse, coordinate information (where a value is empty), scroll wheel information (where a value is empty), and button location information used to indicate that the user performs an operation on a left button of the mouse. Correspondingly, the transmission management module of the tablet computer may receive the mouse operation parameter. After the tablet computer receives the mouse operation parameter, the tablet computer may convert, based on the preset mapping relationship, button bit code of the received mouse operation parameter into button bit code that can be identified by the tablet computer. Then, the tablet computer may simulate, by using the created virtual input device and based on an operation parameter obtained after the button bit code is converted, for example, the mouse operation parameter, a mouse event that can be identified by the tablet computer, that is, may simulate a corresponding input event, for example, the mouse lift event.

After simulating the mouse lift event, the tablet computer may determine the mouse release point based on a current coordinate location of the mouse pointer. For example, after the tablet computer learns that a keyboard and mouse shuttle starts, the tablet computer may register a listener for the coordinate location of the mouse pointer. In this way, the tablet computer may monitor a coordinate location of the mouse pointer on the display of the tablet computer in real time by using the listener. Based on this, after the tablet computer receives the mouse lift event, the tablet computer may obtain a current coordinate location of the mouse pointer on the display of the tablet computer by using the listener. The tablet computer may determine the mouse release point based on the obtained coordinate location. For another example, after the tablet computer invokes the startDragAndDrop method of the AOSP to dispatch the drag event, the tablet computer listens to an input event. For example, when the user continues the drag on the tablet computer, the tablet computer may listen to a motion event, for example, a mouse motion event, and the tablet computer may obtain an operation parameter, for example, a mouse operation parameter, of the mouse motion event based on the mouse motion event. For example, the tablet computer extracts the parameter from MotionEvent. The mouse operation parameter includes coordinate information used to indicate a mouse location. Then, after the user lifts a finger, and the tablet computer listens and detects a lift event, for example, a mouse lift event, the tablet computer may determine the coordinate location of the mouse pointer based on the previously obtained coordinate information, to determine the mouse release point based on the obtained coordinate location.

After the user releases the mouse, because the PC end directly intercepts the received lift event, for example, the mouse lift event, the drag event at the PC end is not released. In this case, after receiving the mouse lift event, the tablet computer may send signaling to the PC through the established connection, to notify the PC of a drag release event.

In addition, the tablet computer may further correspondingly respond to the lift event, for example, the mouse lift event. For example, the content in S502 is a text. After the tablet computer simulates the mouse lift event, the drag management module of the tablet computer may send the content data in the drag event to a view control at the mouse release point. The content data includes the text. After receiving the content data, the view control may perform corresponding processing based on the text in the content data, for example, display the text on the view control. For another example, the content in S502 is a file. In a process of dragging the file on the tablet computer, the file is actually not transmitted to the tablet computer. Therefore, after the user releases the mouse, and the PC receives, from the tablet computer, the signaling for notifying the drag release event, the PC may transfer the file to the tablet computer. After receiving the file, the tablet computer may store the file in a predetermined cache directory. In this case, the drag management module of the tablet computer may obtain a URI (for example, referred to as URI 1) of the file. The URI 1 is a path of the file in the cache directory, and is different from the URI in the drag event content sent by the PC to the tablet computer in S507 (where the URI sent by the PC is a storage path of the file on the PC). The drag management module of the tablet computer may construct new content data based on the URI 1, and in response to the mouse lift event, send the content data to the view control at the mouse release point. After receiving the content data, the view control may perform corresponding processing. For example, if the view control is a view control in a notepad, the file may be displayed. For another example, if the view control is an input box in a chat window, the file may be sent.

In some other embodiments, when the tablet computer further establishes a connection to another device, for example, a mobile phone, if the user wants to continue to drag the content to the mobile phone, the user may continue to move the mouse, so that the mouse pointer on the tablet computer slides over an edge of the display of the tablet computer, and triggers a mouse shuttle from the tablet computer to the mobile phone, to continue the drag event on the mobile phone. It should be noted that, after the mouse shuttles to the mobile phone, the PC may directly interact with the mobile phone, so that the drag event is continued on the mobile phone. Specific descriptions of continuing the drag event on the mobile phone are similar to the specific descriptions of continuing the drag event on the tablet computer. Details are not described herein again.

It may be understood that, by using the foregoing process, on a premise that projection is not started, the user may use the input device, for example, the mouse of the PC, to move content, for example, a text or a file in an application on the PC, to an edge of a screen of the PC in a drag manner and continue to move the content in a same direction, to trigger a mouse shuttle. After the mouse shuttle starts, the mouse pointer appears on the tablet computer. In addition, the PC sends drag event content to the tablet computer, so that a drag event may continue to be attached to the mouse pointer of the tablet computer, to continue the drag event on the tablet computer. This gives the user a visual effect of dragging the content from the PC to the tablet computer.

In this embodiment of this application, the user may have a requirement of transferring the content on the PC to the tablet computer in a drag manner, and continuing to drag the content on the tablet computer, and may further have a requirement of transferring content on the tablet computer to the PC in a drag manner. For example, with reference to the examples in S501 to S510, the user transfers a picture 1 on the PC to the tablet computer in a drag manner, and releases the mouse after continuing to drag the picture 1 on the tablet computer. Then, the user edits the picture 1 by using a stylus of the tablet computer, and then saves an edited picture 1. The user wants to transfer the edited picture 1 to the PC in a drag manner, and release the mouse after continuing to drag the picture 1 on the PC, to save the edited picture 1 on the PC end.

Figure 10:
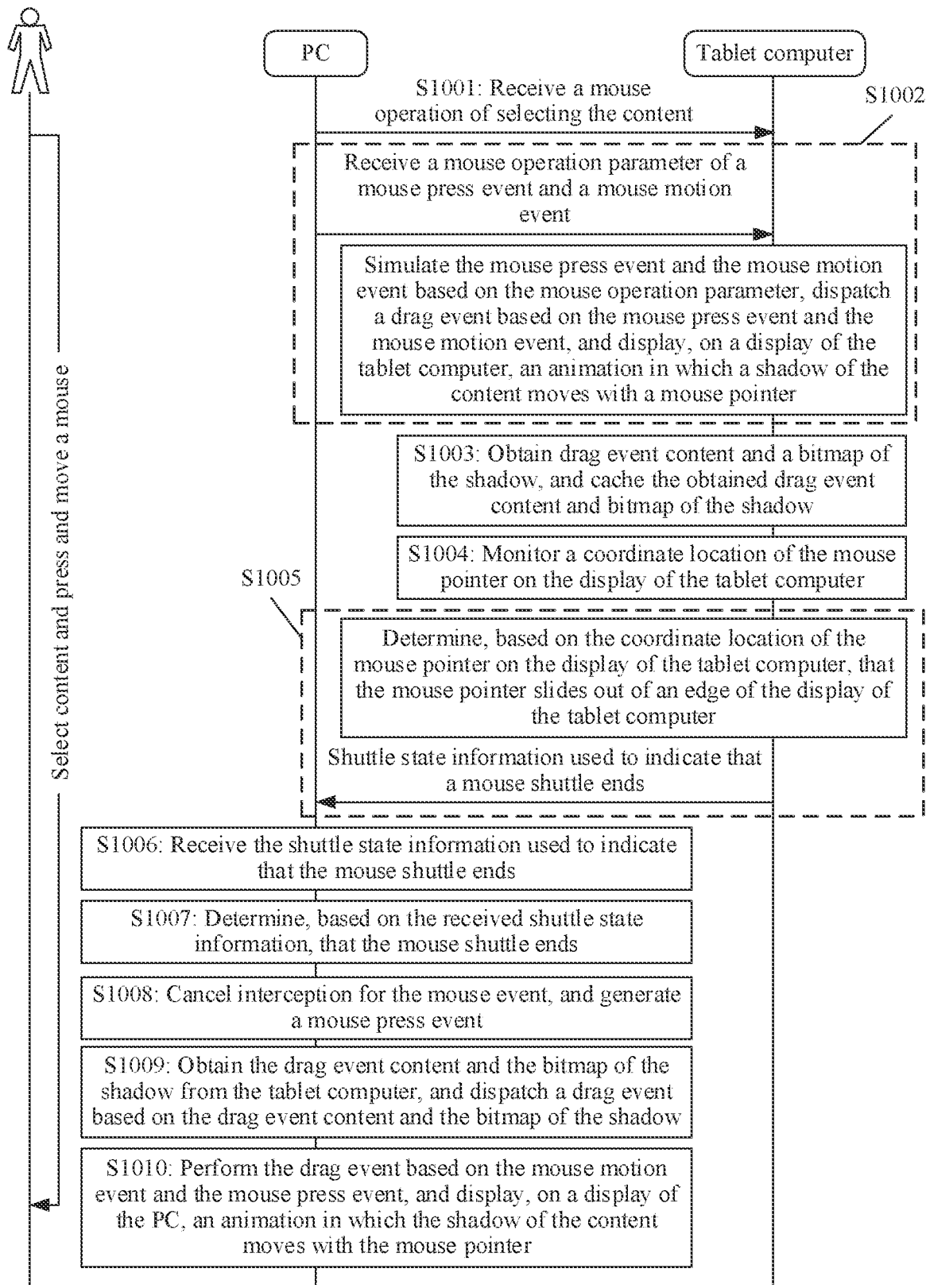
FIG. 10 is a schematic flowchart of another cross-device object drag method according to an embodiment of this application.

FIG. 10 is a schematic flowchart of another cross-device object drag method according to an embodiment of this application. With reference to the embodiment shown in FIG. 5, the following describes the method provided in this embodiment by using an example in which after a mouse shuttle occurs, the user wants to transfer content on the tablet computer to the PC in a drag manner and continue to drag the content on the PC. As shown in FIG. 10, the method may include the following S1001 to S1010.

S1001: The tablet computer receives a mouse operation that is of selecting the content and that is from the PC.

S1002: The tablet computer receives mouse operation parameters of a mouse press event and a mouse motion event from the PC, simulates the mouse press event and the mouse motion event based on the mouse operation parameters, dispatches a drag event based on the mouse press event and the mouse motion event, and displays, on the display of the tablet computer, an animation in which a shadow of the content moves with a mouse pointer.

As described in the embodiment shown in FIG. 5, after the keyboard and mouse sharing mode is enabled, if the mouse shuttle occurs, the PC uses the mounted hook to intercept a corresponding input event, for example, a mouse event, after the user operates the input device of the PC, for example, the mouse. In addition, the PC captures an operation parameter included in the intercepted mouse event, for example, a mouse operation parameter, and sends the captured operation parameter to the tablet computer. For example, after the mouse shuttles to the tablet computer, the user wants to transfer the content on the tablet computer to the PC in a drag manner and continue to drag the content on the PC. With reference to FIG. 4, the user uses the input device of the PC, for example, the mouse, to select the content that the user wants to drag. The keyboard and mouse module of the PC may receive a corresponding input operation, for example, a mouse operation. The keyboard and mouse module of the PC intercepts a received corresponding input event, for example, a mouse event, by using the HOOK, so that the input event is not sent to the Windows system of the PC. In this way, the PC does not respond to the received input event. The keyboard and mouse module of the PC further captures, by using the HOOK, an operation parameter in the intercepted input event, for example, a mouse operation parameter, and transmits the operation parameter to the tablet computer through an established connection by using the transmission management module of the PC. In this case, the transmission management module of the tablet computer may receive the corresponding operation parameter, for example, the mouse operation parameter. After performing button bit code conversion on the received operation parameter, the tablet computer may simulate the corresponding input event, for example, the mouse event, by using the created virtual input device.

Then, when the mouse pointer of the tablet computer is displayed on an object that the user wants to drag, for example, the content selected by the user, the user may use the input device of the PC, for example, the mouse, to input a drag operation, so that the tablet computer may drag the corresponding object, that is, drag the content, based on the drag operation. The drag operation may be an operation used to indicate to dispatch the drag event for the selected content. The drag operation may include one operation, or may include a plurality of operations. For example, the drag operation includes two operations; a press operation and a motion operation. For example, the input device is the mouse. The press operation may be a mouse press operation, and the motion operation may be a mouse motion operation. For example, the user may press and move the mouse of the PC, that is, use the mouse of the PC to input the mouse press operation and the mouse motion operation. Then, the keyboard and mouse module of the PC may correspondingly receive a press event (for example, the mouse press event) and a motion event (for example, the mouse motion event). Similarly, the keyboard and mouse module of the PC may intercept the received mouse press event and mouse motion event by using the HOOK, capture the operation parameters of the intercepted mouse press event and mouse motion event, for example, the mouse operating parameters, and send the captured operation parameters to the tablet computer through the established connection by using the transmission management module of the PC. In this case, the transmission management module of the tablet computer may receive the corresponding operation parameter, for example, the mouse operation parameter. After performing button bit code conversion on the received operation parameter, the tablet computer may simulate the corresponding input event by using the created virtual input device, for example, simulate the press event (for example, the mouse press event) and the motion event (for example, the mouse motion event).

Figure 11:
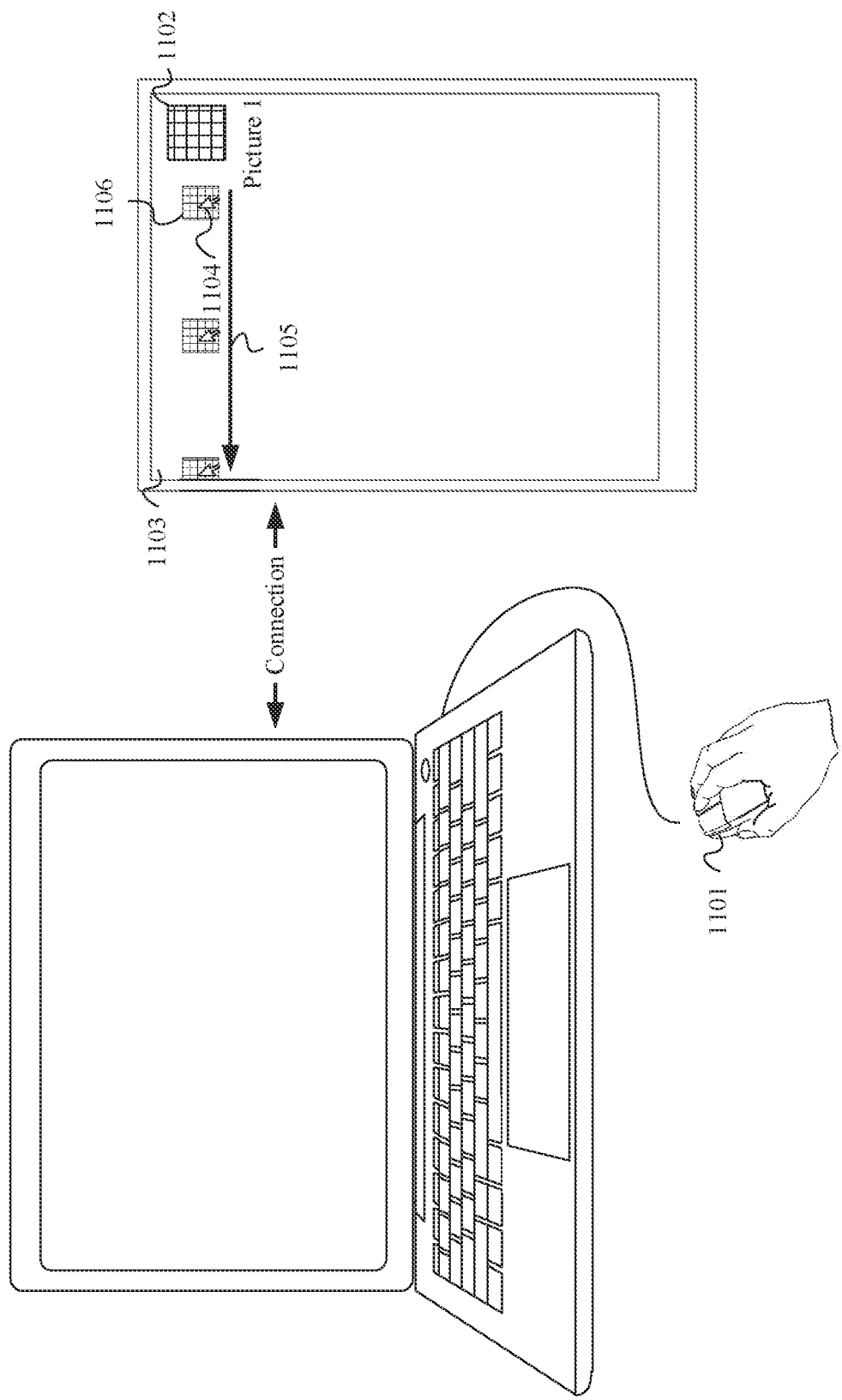
FIG. 11 is a schematic diagram of yet another cross-device object drag interface according to an embodiment of this application.

After the tablet computer simulates the press event (for example, the mouse press event) and the motion event (for example, the mouse motion event), in response to these events, the tablet computer may dispatch the drag event by using a corresponding application (for example, if the selected content is a Word document, the application is an office application; for another example, if the selected content is a picture in a file manager, the application is the file manager; or for still another example, if the selected content is a text in a notepad, the application is the notepad), and draw the content. For example, the animation in which the shadow of the content moves with the mouse pointer is displayed on the display of the tablet computer. For example, the user edits, by using the stylus of the tablet computer, the picture 1 dragged from the PC, and then saves the edited picture 1. The user wants to drag the edited picture to the PC and continue to drag the edited picture on the PC. As shown in FIG. 11, the user may select the edited picture 1102 by using a mouse 1101, and then presses and moves the mouse 1101. As the mouse 1101 moves, the tablet computer correspondingly displays, on a display 1103 of the tablet computer, an animation in which a shadow 1106 of the edited picture 1102 moves with a mouse pointer 1104. As shown in FIG. 11, a drag track along which the shadow 1106 of the picture 1102 moves with the mouse pointer 1104 is shown as a track 1105.

It should be noted that the foregoing uses an example in which a drag trigger event includes the press event and the motion event for description. For example, the user may press and move the mouse to trigger a drag. In some other embodiments, the drag trigger event may include only the press event. For example, the user may trigger a drag by touching and holding the mouse, or the user may trigger a drag by pressing the mouse. This is not specifically limited herein in this embodiment.

S1003: The tablet computer obtains drag event content and a bitmap of the shadow, and cache the obtained drag event content and bitmap of the shadow.

The drag event content is used by the drag continuation end device to construct the drag event. For example, when the content in S1101 is a text, the drag event content may include the text (text). For another example, when the content in S1101 is a file or a folder, the drag event content may include a file path (for example, a URI).

For example, with reference to FIG. 4, when the application on the tablet computer dispatches the drag event, the corresponding drag event content may be called back by a framework layer to an application layer. For example, when the application invokes the startDragAndDrop method provided by the AOSP interface to dispatch the drag event, the framework layer may extract the drag event content in a manner of program instrumentation. For example, a location and content that require instrumentation may be predetermined, and then program instrumentation is performed based on the determined location and content, to extract the drag event content. Then, the framework layer of the tablet computer may call back the extracted drag event content to the drag management module at the application layer of the tablet computer. After obtaining the drag event content, the drag management module of the tablet computer may cache the drag event content. In an example, the drag event content required for continuing the drag event may include a text, a file path, or the like. When the application dispatches the drag event, the framework layer may extract the text or the file path in the manner of program instrumentation.

In addition, in this embodiment, the drag event may be dispatched in two manners. In one manner, the drag management module of the tablet computer dispatches the drag event (to be specific, the drag shuttles from the PC to the tablet computer, as described in the embodiment shown in FIG. 5). In the other manner, the application on the tablet computer dispatches the drag event. In addition, with reference to the descriptions of the data structure shown in FIG. 8 in the embodiment shown in FIG. 5, it may be learned that, in this embodiment, a content description of the drag event on the tablet computer includes a label (label), and the label is used to indicate whether the drag event is dispatched by the drag management module of the tablet computer or dispatched by the application on the tablet computer. It may be understood that, the drag event content needs, only when the drag event is dispatched by the application on the tablet computer, or not dispatched by the drag management module of the tablet computer, to be obtained and cached, so that the drag event content is used by the PC to continue the drag event after the drag shuttles to the PC. In other words, after the drag event is dispatched, the tablet computer may distinguish, based on the label (label) in the content description of the drag event, whether the drag event is dispatched by the application on the tablet computer or dispatched by the drag management module of the tablet computer. If the label is not "windowscast", it may be determined that the drag event is not dispatched by the drag management module of the tablet computer, but dispatched by the application of the tablet computer. The framework layer needs, only when the drag event is not dispatched by the drag management module of the tablet computer, to obtain the drag event content, and send the obtained drag event content to the drag management module of the tablet computer, so that the drag service module caches the drag event content.

In addition, in this embodiment, the framework layer may further obtain the bitmap (bitmap) of the shadow through a new interface or an original interface (for example, an interface for calling back clipData). The obtained bitmap of the shadow may also be called back to the drag management module at the application layer of the tablet computer. After obtaining the bitmap of the shadow, the drag management module of the tablet computer may also cache the bitmap of the shadow.

S1004: The tablet computer monitors a coordinate location of the mouse pointer on the display of the tablet computer.

S1005: When determining, based on the coordinate location of the mouse pointer on the display of the tablet computer, that the mouse pointer slides out of the edge of the display of the tablet computer, the tablet computer sends, to the PC, shuttle state information used to indicate that the mouse shuttle ends.

S1006: The PC receives the shuttle state information used to indicate that the mouse shuttle ends.

In a process in which the content (for example, the shadow of the content) moves with the mouse pointer, the tablet computer may determine whether the dragged content (for example, the shadow of the content) is dragged out from the edge of the display of the tablet computer. When the content (for example, the shadow of the content) is dragged out from the edge of the display of the tablet computer, it indicates that the user wants to control another device by using the mouse. In this embodiment, specific descriptions of dragging the content out from the edge of the display of the tablet computer are similar to the specific descriptions of dragging the content out from the PC. Details are not described herein again. The following uses an example in which determining whether the dragged content (for example, the shadow of the content) is dragged out from the edge of the display of the tablet computer is specifically determining whether the mouse pointer slides out of the edge of the display of the tablet computer for description.

In an example, after the drag event is dispatched, the mouse pointer moves on the display of the tablet computer, and the tablet computer may monitor a real-time coordinate location of the mouse pointer on the display of the tablet computer. For example, after a keyboard and mouse shuttle starts, the tablet computer may register a listener for the coordinate location of the mouse pointer. In this way, the tablet computer may monitor a coordinate location of the mouse pointer on the display of the tablet computer in real time by using the listener. The tablet computer may determine, based on a real-time coordinate location that is of the mouse pointer on the display of the tablet computer and that is monitored by the listener, whether the mouse pointer slides over the edge of the display of the tablet computer. For example, the tablet computer may determine the coordinate location of the mouse pointer on the display of the tablet computer based on an initial location and relative displacement of the mouse pointer, to determine whether the mouse pointer slides out of the edge of the display of the tablet computer. The initial location of the mouse pointer may be a coordinate location of the mouse pointer on the display of the tablet computer when the mouse starts to move, or a coordinate location of the mouse pointer on the display of the tablet computer before the mouse starts to move. The initial location of the mouse pointer may be specifically a coordinate location in a coordinate system in which the upper left corner of the display of the tablet computer is used as a coordinate origin, an X axis points from the upper left corner to the right edge of the display of the tablet computer, and a Y axis points from the upper left corner to the lower edge of the display of the tablet computer. A specific implementation in which the tablet computer determines that the mouse pointer slides out of the edge of the display of the mobile phone is similar to the specific implementation in which the PC determines that the mouse pointer slides out of the edge of the display of the PC. Details are not described herein again.

After the tablet computer determines that the mouse pointer slides over the edge of the display of the tablet computer, it indicates that the user wants to control the another device by using the mouse. As described in S506, if the tablet computer establishes a connection to only the PC, it indicates that the user wants to control the PC by using the mouse. If the tablet computer establishes connections to a plurality of devices, the mobile phone may display a list option. The list option includes identifiers of all the devices connected to the tablet computer, for the user to select a device that the user wants to control by using the mouse. If the user selects an identifier of the PC, it indicates that the user wants to control the PC by using the mouse. Alternatively, a shuttle relationship may be pre-configured on the tablet computer, and is used to determine a device to which the mouse shuttles, that is, determine a specific device responding to the operation of the mouse. Specific descriptions of configuration and application of the shuttle relationship are similar to the descriptions of corresponding content in the foregoing embodiment. Details are not described herein again. When it is determined that the user wants to control the PC by using the mouse, the tablet computer may determine that the mouse shuttle ends. In this case, the tablet computer may send, to the PC through the established connection, the shuttle state information used to indicate that the mouse shuttle ends.

S1007: The PC determines, based on the received shuttle state information, that the mouse shuttle ends.

S1008: The PC cancels interception for the mouse event, and generates a mouse press event.

S1009: The PC obtains the drag event content and the bitmap of the shadow from the tablet computer, and dispatches a drag event based on the drag event content and the bitmap of the shadow.

After receiving the shuttle state information used to indicate that the mouse shuttle ends, the PC may determine that the mouse shuttle ends.

After determining that the mouse shuttle ends, the PC may display the mouse pointer on the display of the PC. With reference to the descriptions in the embodiment shown in FIG. 5, when the mouse shuttle starts, the PC hides the mouse pointer on the display of the PC. Therefore, after determining that the mouse shuttle ends, the PC may display the mouse pointer on the display of the PC again. In addition, a trigger condition for starting the mouse shuttle is that the mouse pointer slides over the edge of the display of the PC. Therefore, the mouse pointer is displayed on the edge of the display of the PC before being hidden. In this case, in this embodiment, when the mouse shuttle ends, after the PC cancels hiding of the mouse pointer, the mouse pointer is displayed on the edge of the display of the PC. Certainly, when the mouse shuttle ends, the mouse pointer at the tablet computer end is no longer displayed. This gives the user a visual effect that the mouse pointer shuttles from the tablet computer to the PC.

After it is determined that the mouse shuttle ends, the PC further needs to uninstall the HOOK (or close the HOOK), to cancel interception for the input device, for example, the mouse event. For example, after the user transfers the content on the tablet computer to the PC in a drag manner by moving the mouse, and triggers the mouse to end the shuttle, the user continues to move the mouse in a same direction, and the keyboard and mouse module of the PC may receive a motion event, for example, a mouse motion event. Because the HOOK has been uninstalled at this time, the keyboard and mouse module of the PC sends the received motion event, for example, the mouse motion event, to the Windows system of the PC, so that the Windows system of the PC responds to the motion event.

In addition, before the mouse shuttle ends, the tablet computer is in a state of being performing drag, and that the mouse shuttles back to the PC is to continue the drag, that is, continue the drag on the PC. On a Windows platform, a drag can be normally dispatched only when the mouse is pressed on a window. However, in a process in which the user continues to move the mouse, the PC may receive only the motion event, for example, a mouse motion event, that is, does not receive the press event, for example, the mouse press event. Therefore, the PC (for example, the drag management module of the PC) may generate a press event, for example, a mouse press event, and transmit the press event to an invisible window. For example, after the PC determines that the mouse shuttle ends, when the tablet computer is being in drag, the PC may generate the mouse press event, and transmit the mouse press event to the invisible window, so that the drag event dispatched by the PC end in S1009 can be attached to the mouse pointer displayed on the display of the PC, that is, the drag event continues on the PC end.

In this embodiment, after determining that the mouse shuttle ends, the PC may further request a drag state (namely, whether the tablet computer is being in drag) of the tablet computer from the tablet computer. When the drag state returned by the tablet computer indicates that the tablet computer is being in drag, the PC may request the drag event content and the bitmap of the shadow from the tablet computer. The PC may send a request message to the tablet computer. The request message may be used to request drag data, that is, is used to request the drag event content and the bitmap of the shadow.

For example, with reference to FIG. 4, when the PC determines that the mouse shuttle ends, the keyboard and mouse module of the PC may send, to the drag management module of the PC, an indication indicating that the mouse shuttle ends. The drag management module of the PC may request the drag state from the tablet computer based on the received indication by using the transmission management module of the PC. When the drag state returned by the tablet computer indicates that the tablet computer is being in drag, the drag management module of the PC may request, from the tablet computer by using the transmission management module of the PC, the drag event content and the bitmap of the shadow. Correspondingly, the transmission management module of the tablet computer may receive the request, and forward the request to the drag management module of the tablet computer. After receiving the request, the drag management module of the tablet computer may feed back, to the transmission management module of the PC by using the transmission management module of the tablet computer, the drag event content and the bitmap of the shadow that are cached in S1003.

With reference to the descriptions in S1003, after receiving the drag event content, the transmission management module of the PC may transmit the drag event content to the drag management module of the PC. The drag management module of the PC parses the received drag event content, to obtain the text or the file path from the tablet computer. Based on the obtained text or file path, the drag management module of the PC may construct a data object of the drag event, for example, IDataObject. In addition, after receiving the bitmap of the shadow, the transmission management module of the PC may restore the shadow at the PC end based on the bitmap. For example, an IDragSourceHelper interface provided by the PC end may be used to restore the shadow. Then, the PC may dispatch the drag event at the PC end. For example, with reference to the descriptions in the embodiment shown in FIG. 5, when the mouse shuttle starts, the PC displays an invisible window. Therefore, the PC may dispatch the drag event by using the displayed invisible window. After the drag event is dispatched, the invisible window may be closed.

S1010: The PC performs the drag event based on the mouse motion event and the mouse press event, and displays, on a display of the PC, an animation in which the shadow of the content moves with the mouse pointer.

Figure 12:
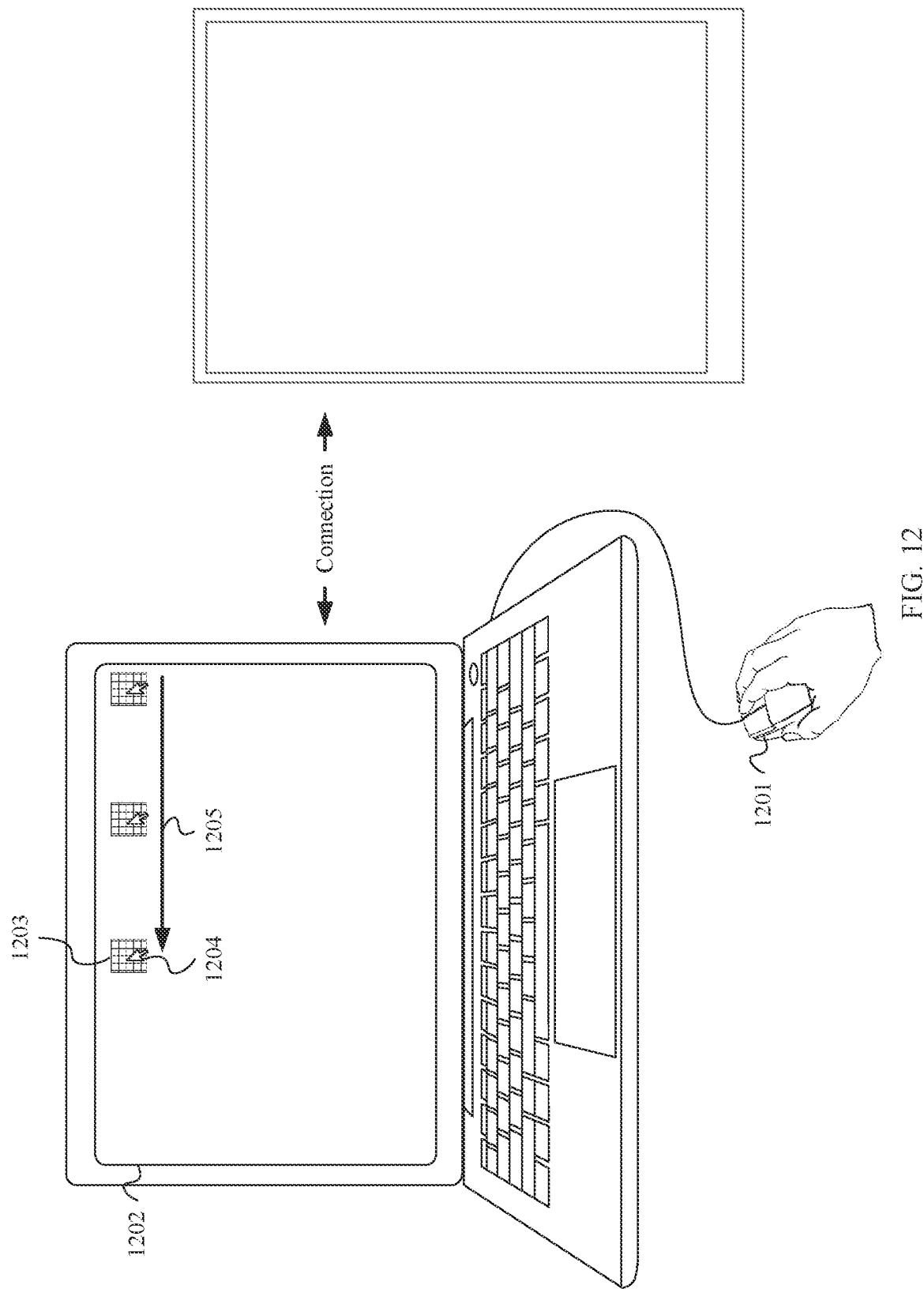
FIG. 12 is a schematic diagram of still another cross-device object drag interface according to an embodiment of this application.

After the drag event is dispatched, in response to the motion event, for example, the mouse motion event, and the press event, for example, the mouse press event, the PC may perform the drag event, and display the content on the display of the PC, for example, the animation in which the shadow of the content moves with the mouse pointer. For example, with reference to FIG. 11, as shown in FIG. 12, as the mouse 1201 moves, the PC correspondingly displays, on a display 1202 of the PC, an animation in which a shadow 1203 of an edited picture moves with a mouse pointer 1204. As shown in FIG. 12, a drag track along which the shadow 1203 moves with the mouse pointer 1204 is shown as a track 1205.

It should be noted that, in the foregoing example, an example in which the user first drags the content from the PC to the tablet computer, and then drags the content from the tablet computer to the PC is used for description. In some other embodiments, the user may not drag the content from the PC to the tablet computer, but directly drag content on the tablet computer to the PC. A specific implementation in this embodiment is similar to the specific implementation in the embodiments shown in FIG. 5 and FIG. 10, and a difference lies in that S502 is not performed. S503 is replaced with a step of receiving the motion event (for example, the mouse motion event), and displaying the animation in which the mouse pointer moves on the display of the PC based on the motion event. S506 is not performed, but an operation of displaying the invisible window by the PC needs to be performed, except that the invisible window does not receive the drag event. S507 and S509 are not performed. S510 is replaced with a step in which the tablet computer displays, on the display of the tablet computer based on the motion event, for example, the mouse motion event, the animation in which the mouse pointer moves. In other words, after the mouse shuttle starts, the tablet computer may receive an operation that is of moving the mouse pointer displayed on the tablet computer end and that is input by the user by using the input device of the PC, for example, the mouse. In response to the operation, the tablet computer may display, on the display of the tablet computer, the animation in which the mouse pointer moves. If the user wants to drag a piece of content, the user may continue to move the mouse of the PC until the mouse pointer moves to the content. Specifically, that the tablet computer receives the operation that is of moving the mouse pointer and that is input by the user by using the input device of the PC, for example, the mouse, may be as follows: The PC intercepts a corresponding motion event, for example, a mouse motion event, and sends an operation parameter included in the motion event to the tablet computer. The tablet computer may simulate the motion event, for example, the mouse motion event, based on the operation parameter, to display, on the display of the tablet computer, the animation in which the mouse pointer moves. Another operation is similar. Details are not described herein again in this embodiment of this application.

In the foregoing embodiment, an example in which the tablet computer caches the drag data when drag starts, and the PC requests the drag data from the tablet computer after the mouse shuttle ends is used for description. In some other embodiments, when the drag starts, the tablet computer may not cache the drag data, but after determining that the mouse shuttle ends, obtains and actively sends the drag data to the PC without a request of the PC. In addition, in the foregoing embodiment, an example in which the input device is the mouse is used for description. In this embodiment, the input device may alternatively be a touchpad. When the input device is the touchpad, the user may input a press operation by using a button (a left button or a right button) of the touchpad, and input a motion operation by sliding a finger on the touchpad. A specific implementation in which the user drags the object by using the touchpad is similar to the specific implementation in which the user drags the object by using the mouse. Details are not described herein again.

According to the method provided in this embodiment, on a premise that projection is not started, when a keyboard and mouse sharing technology is used, the user can use the input device, for example, the mouse, to enable, in a drag manner, the content, for example, the text or the file, to shuttle with the mouse pointer between a plurality of terminals participating in collaborative use. In addition, the user is allowed to use these terminals to process the transmitted content, so that hardware capabilities of the plurality of terminals can all participate in collaborative office. In addition, because projection does not need to be started, no display space of a display of a terminal is occupied. This improves usage efficiency of collaboratively using a plurality of terminals, and improves user experience.

It should be noted that the foregoing embodiment is described by using an example in which the dragged object is content such as a text or a file. In some other embodiments, the dragged object may alternatively be an icon of an application; or the dragged object may be a window, where the window may include an interface of the application. When the object is the icon of the application, the drag data may include the icon of the application; or when the object is the window, the drag data may include the interface of the application (for example, a screenshot of the interface of the application). A specific implementation thereof is similar to the specific implementation of dragging the content such as the text or the file in the foregoing embodiment. Details are not described herein again. A difference lies in that, when the drag object is the icon of the application or the interface of the application, after it is determined that the object is dragged out from the edge of the display of the PC, there is no need to create an invisible window, and the tablet computer does not need to enable a transparent activity. In addition, after receiving the drag data, the tablet computer does not need to construct a drag event, but directly performs drag continuation based on the icon of the application or the interface of the application that is included in the drag data. In addition, the tablet computer does not need to generate a mouse press event, but enables, based on the mouse motion event, the icon or a window that is of the application to move with motion of the mouse pointer on the tablet computer. In addition, after the user releases the mouse and the tablet computer sends a received mouse lift event to the PC, the PC may send the interface of the dragged application to the tablet computer, so that the tablet computer displays the interface of the application on the display of the tablet computer. For example, the user may use the input device of a PC to drag an icon of an application or an interface of an application that is displayed on the display of the PC to the tablet computer in a drag manner. The user may continue to use the input device of the PC to drag the icon of the application or the interface of the application on the tablet computer, or the user may release the drag. After the user releases the drag, the tablet computer may display the interface of the application on the tablet computer.

Figure 13:
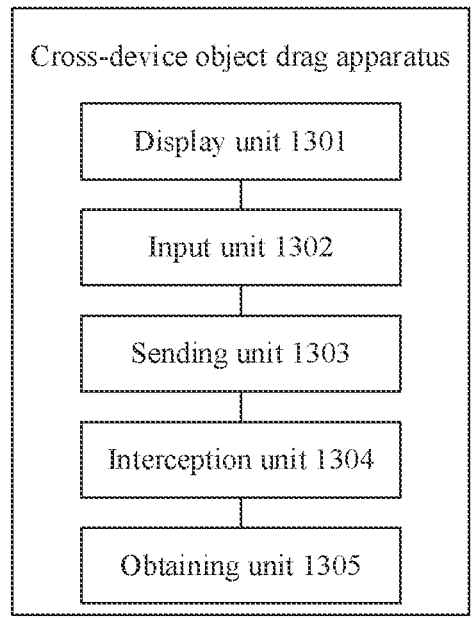
FIG. 13 is a schematic diagram of composition of a cross-device object drag apparatus according to an embodiment of this application.

FIG. 13 is a schematic diagram of composition of a cross-device object drag apparatus according to an embodiment of this application. As shown in FIG. 13, the apparatus may be applied to a first terminal (for example, the foregoing PC), the first terminal is connected to a second terminal, and the apparatus may include: a display unit 1301, an input unit 1302, and a sending unit 1303.

The display unit 1301 is configured to display a first cursor on an object displayed on the first terminal.

The input unit 1302 is configured to receive a drag operation input by a user by using an input device of the first terminal, where the drag operation is used to dispatch a drag for the object.

The display unit 1301 is further configured to: display, on the display of the first terminal based on the drag operation, an animation in which the object moves with the first cursor.

The sending unit 1303 is configured to send drag data to the second terminal when determining that the object is dragged out from an edge of the display of the first terminal.

Further, the drag data may be used by the second terminal to dispatch a drag event for the object, so that the second terminal displays, on a display of the second terminal, an animation in which the object moves with a second cursor.

Further, the foregoing drag operation may include a press operation and a motion operation. The sending unit 1303 is further configured to: send, to the second terminal, data of the motion operation input by the user by using the input device of the first terminal.

Further, the apparatus may further include an interception unit 1304.

The interception unit 1304 is configured to: intercept a motion event in a process in which the user performs the motion operation by using the input device of the first terminal. The sending unit 1303 is specifically configured to: send, to the second terminal, an operation parameter included in the motion event.

Further, the sending unit 1303 is further configured to send shuttle state information to the second terminal, where the shuttle state information is used to indicate that a shuttle starts.

Further, the display unit 1301 is specifically configured to: display, on the display of the first terminal, an animation in which a shadow of the object moves with the first cursor.

Further, the display unit 1301 is further configured to hide the first cursor and the shadow of the object.

Further, the object may be a text, a file, or a folder; and the drag data includes drag event content and a bitmap of the shadow. When the object is the text, the drag event content includes the text; or when the object is the file or the folder, the drag event content is a file path.

Further, the display unit 1301 is further configured to display an invisible window, where transparency of the invisible window is greater than a threshold, and the invisible window is used to receive the drag event. The apparatus may further include an obtaining unit 1305. The obtaining unit 1305 is configured to: obtain the drag event content from the drag event that is received by the invisible window, and obtain the bitmap of the shadow.

Further, the object may be an icon of an application; or the object may be a window, and the window includes an interface of an application. When the object is the icon of the application, the drag data includes the icon of the application; or when the object is the window, the drag data includes the interface of the application.

Figure 14:
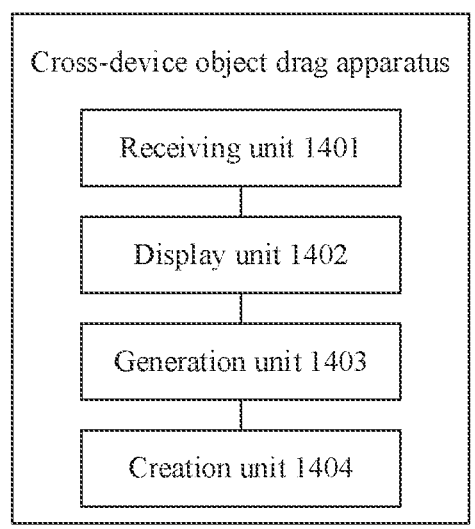
FIG. 14 is a schematic diagram of composition of another cross-device object drag apparatus according to an embodiment of this application.

FIG. 14 is a schematic diagram of composition of another cross-device object drag apparatus according to an embodiment of this application. As shown in FIG. 14, the apparatus may be applied to a second terminal (for example, the foregoing tablet computer), the second terminal is connected to a first terminal, and the apparatus may include: a receiving unit 1401 and a display unit 1402.

The display unit 1402 is configured to: display, on a display of the second terminal, an object dragged from the first terminal; and display a second cursor on the object.

The receiving unit 1401 is configured to receive a motion operation input by a user by using an input device of the first terminal.

The display unit 1402 is further configured to: display, on the display of the second terminal based on the motion operation, an animation in which the object moves with the second cursor.

Further, the receiving unit 1401 is further configured to receive shuttle state information from the first terminal, where the shuttle state information is used to indicate that a shuttle starts.

Further, the receiving unit 1401 is further configured to receive drag data from the first terminal. The display unit 1402 is specifically configured to: display, on the display of the second terminal based on the drag data, the object dragged from the first terminal.

The drag data and the motion operation are sent by the first terminal to the second terminal after the first terminal determines, when the object moves with a first cursor on the display of the first terminal, that the object is dragged out from an edge of the display of the first terminal, and are used to dispatch a drag event for the object.

Further, the foregoing apparatus may further include a generation unit 1403 that is configured to generate a press operation.

The display unit 1402 is specifically configured to: display, on the display of the second terminal based on the motion operation, the press operation, and the drag data, the animation in which the object moves with the second cursor.

Further, the generation unit 1403 is specifically configured to simulate the press event according to an operation parameter of the press operation. The receiving unit 1401 is specifically configured to receive an operation parameter from the first terminal. The generation unit 1403 is further configured to simulate a motion event according to the operation parameter, where the operation parameter is an operation parameter included in a motion event received by the first terminal after the user performs the motion operation by using the input device of the first terminal. The display unit 1402 is specifically configured to: display, on the display of the second terminal in response to the press event and the motion event based on the drag data, the animation in which the object moves with the second cursor.

Further, the apparatus may further include a creation unit 1404.

The creation unit 1404 is configured to: create a virtual input device after the connection to the first terminal is successfully established. Alternatively, the receiving unit 1401 is further configured to receive a notification message from the first terminal, where the notification message is used to indicate that a keyboard and mouse sharing mode of the first terminal is enabled; and the creation unit 1404 is configured to: create the virtual input device in response to the notification message, where the virtual input device is used by the second terminal to simulate an input event according to an operation parameter.

Further, the display unit 1402 is specifically configured to: display, on the display of the second terminal, a shadow of the object dragged from the first terminal.

The display unit 1402 is specifically configured to: display, on the display of the second terminal based on the motion operation, an animation in which the shadow of the object moves with the second cursor.

Further, the object may be a text, a file, or a folder; and the drag data includes drag event content and a bitmap of the shadow. When the object is the text, the drag event content includes the text; or when the object is the file or the folder, the drag event content is a file path.

Further, the creation unit 1404 is further configured to create an invisible activity, where the invisible activity has a view control whose transparency is greater than a threshold, and the view control is used to dispatch the drag event.

Further, the object is an icon of an application; or the object is a window, and the window includes an interface of an application. When the object is the icon of the application, the drag data includes the icon of the application; or when the object is the window, the drag data includes the interface of the application.

An embodiment of this application further provides a cross-device object drag apparatus. The apparatus may be applied to the first terminal or the second terminal in the foregoing embodiment. The apparatus may include a processor and a memory configured to store instructions executable by the processor. The processor is configured to implement, when executing the instructions, functions or steps performed by the PC or the tablet computer in the foregoing method embodiment.

An embodiment of this application further provides a terminal (the terminal may be the first terminal or the second terminal in the foregoing embodiment). The terminal may include: a display, a memory, and one or more processors. The display and the memory are coupled to the processor. The memory is configured to store computer program code. The computer program code includes computer instructions. When the processor executes the computer instructions, the terminal may perform the functions or the steps performed by the PC or the tablet computer in the foregoing method embodiment. Certainly, the terminal includes but is not limited to the foregoing display, memory, and one or more processors. For example, for a structure of the terminal, refer to the structure of the tablet computer shown in FIG. 2.

Figure 15:
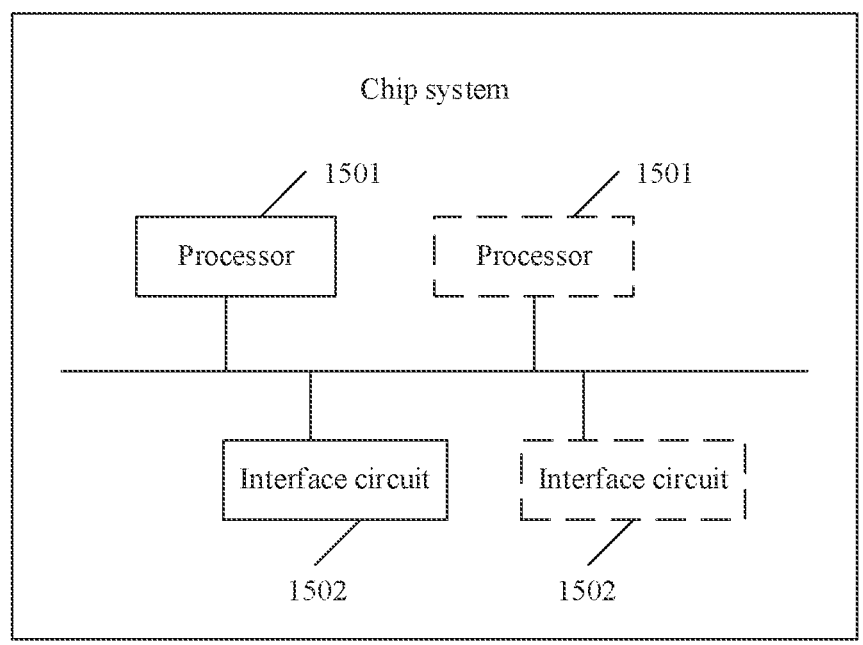
FIG. 15 is a schematic diagram of composition of a chip system according to an embodiment of this application.

An embodiment of this application further provides a chip system. The chip system may be applied to the terminal (for example, the first terminal or the second terminal) in the foregoing embodiment. As shown in FIG. 15, the chip system includes at least one processor 1501 and at least one interface circuit 1502. The processor 1501 may be the processor in the foregoing terminal. The processor 1501 and the interface circuit 1502 may be interconnected through a line. The processor 1501 may receive computer instructions from the memory of the foregoing terminal through the interface circuit 1502, and execute the computer instructions. When the computer instructions are executed by the processor 1501, the terminal may be enabled to perform the steps performed by the PC or the tablet computer in the foregoing embodiment. Certainly, the chip system may further include another discrete device. This is not specifically limited in this embodiment of this application.

An embodiment of this application further provides a computer-readable storage medium, configured to store computer instructions run by the foregoing terminal (for example, the PC or the tablet computer).

An embodiment of this application further provides a computer program product, including computer instructions run by the foregoing terminal (for example, the PC or the tablet computer).

The descriptions in the foregoing implementations allow a person skilled in the art to clearly understand that, for the purpose of convenient and brief description, division of the foregoing functional modules is merely used as an example for illustration. In actual application, the foregoing functions can be allocated to different modules and implemented based on a requirement. That is, an inner structure of an apparatus is divided into different functional modules to implement all or some of the functions described above.

In several embodiments provided in this application, it should be understood that the disclosed apparatus and method may be implemented in another manner. For example, the described apparatus embodiment is merely an example. For example, division of the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a second terminal, wherein the method comprises:
   establishing a connection with a first terminal;
   receiving drag data from the first terminal;
   displaying, on a display device based on the drag data, a shadow of an object dragged from the first terminal;
   displaying a first cursor on the shadow of the object;
   receiving, from the first terminal, an operation parameter, wherein the operation parameter is received by the first terminal after a motion operation based on a user motion operation of the first terminal;
   simulating a drag event via a virtual input device of the second terminal according to the operation parameter; and
   displaying, on the display device based on the motion operation, a shadow animation in which the shadow of the object moves with the first cursor,
   wherein the drag data and the operation parameter are initially received after the first cursor is dragged out of an edge of a first terminal display of the first terminal, wherein the shadow of the object moves with the first cursor on the first terminal display,
   wherein the object is a text or a file, wherein the drag data comprises drag event content and a bitmap of the shadow, wherein when the object is the text, the drag event content comprises the text, and wherein when the object is the file, the drag event content is a file path.

2. The method of claim 1, wherein before displaying the object dragged from the first terminal, the method further comprises receiving shuttle state information from the first terminal, wherein the shuttle state information indicates that a shuttle starts.

3. The method of claim 1, wherein the drag data and the motion operation are configured to dispatch the drag event for the object.

4. The method of claim 3, further comprising generating a press operation, wherein the shadow animation is based on the motion operation, the press operation, and the drag data.

5. The method of claim 4, wherein generating the press operation comprises:
   simulating a press event according to a second operation parameter of the press operation; and
   simulating a motion event according to the operation parameter from the first terminal, wherein the operation parameter is included in the motion event received by the first terminal after the user motion operation, and
   wherein displaying the shadow animation in which the object moves with the first cursor comprises displaying, on the display device in response to the press event and the motion event based on the drag data, the animation in which the object moves with the first cursor.

6. The method of claim 5, wherein the operation parameter comprises at least one of a mouse button flag bit, coordinate information, scroll wheel information, or button location information.

7. The method of claim 3, further comprising creating a view control whose transparency is greater than a threshold, and wherein the view control is configured to dispatch the drag event.

8. The method of claim 1, further comprising:
   creating the virtual input device after establishing the connection with the first terminal; or
   receiving a notification message from the first terminal, and creating the virtual input device in response to the notification message, wherein the virtual input device simulates an input event according to the operation parameter.

9. A method comprising:
   displaying an object and a first cursor on the object;
   receiving, by an input device, a drag operation input by a user, wherein the drag operation is configured to dispatch a drag for the object;
   displaying, on a display device in response to the drag operation, a shadow animation in which a shadow of the object moves with the first cursor;
   receiving, an operation parameter after a motion operation based on a user motion operation; and
   start sending drag data and the operation parameter to a second terminal when determining that the first cursor is dragged out of an edge of the display device, wherein a virtual input device the second terminal simulates a drag event according to the operation parameter,
   wherein the object is a text or a file, wherein the drag data comprises drag event content and a bitmap of the shadow, wherein when the object is the text, the drag event content comprises the text, and wherein when the object is the file, the drag event content is a file path.

10. The method of claim 9, wherein the drag operation further comprises a press operation, and wherein when determining that the first cursor is dragged out of the edge of the display device, the method further comprises sending, to the second terminal, data of the motion operation.

11. The method of claim 10, wherein sending the data of the motion operation comprises:
- intercepting a motion event in a process in which the user performs the motion operation using the input device; and
- sending, to the second terminal, the operation parameter included in the motion event.

12. The method of claim 11, wherein the operation parameter comprises at least one of a mouse button flag bit, coordinate information, scroll wheel information, or button location information.

13. The method of claim 9, wherein after determining that the first cursor is dragged out of the edge of the display device, the method further comprises sending shuttle state information to the second terminal, wherein the shuttle state information indicates that a shuttle starts.

14. The method of claim 9, wherein after determining that the first cursor is dragged out of the edge of the display device, the method further comprises hiding the first cursor and the shadow of the object.

15. The method of claim 9, further comprising displaying an invisible window, wherein transparency of the invisible window is greater than a threshold, wherein the invisible window is configured to receive the drag event, and wherein before sending the drag data to the second terminal, the method further comprises:
- obtaining the drag event content from the drag event that is received by the invisible window; and
- obtaining the bitmap of the shadow.

16. A first terminal, comprising:
- an input device configured to receive a drag operation input by a user, wherein the drag operation is configured to dispatch a drag for an object;
- a display device configured to:
  - display the object and a first cursor on the object;
  - display, in response to the drag operation, a shadow animation in which a shadow of the object moves with the first cursor; and
- a processor coupled to the input device and the display device, wherein the processor is configured to:
  - receive, an operation parameter after a motion operation based on a user motion operation;
  - determine that the first cursor is dragged out of an edge of the display device; and
  - start to send drag data and the operation parameter to a second terminal when determining that the first cursor is dragged out of the edge of the display device, wherein a virtual input device the second terminal simulates a drag event according to the operation parameter,
- wherein the object is a text or a file, wherein the drag data comprises drag event content and a bitmap of the shadow, wherein when the object is the text, the drag event content comprises the text, and wherein when the object is the file, the drag event content is a file path.

17. The first terminal of claim 16, wherein after the first terminal determines that the first cursor is dragged out of the edge of the display device, the processor is further configured to send, to the second terminal, shuttle state information indicating that a shuttle starts.

18. The first terminal of claim 16, wherein after the first terminal determines that the first cursor is dragged out of the edge of the display device, the processor is further configured to hide the first cursor and the shadow of the object.

\* \* \* \* \*